(12) United States Patent
Onda et al.

(10) Patent No.: US 12,704,710 B2
(45) Date of Patent: Aug. 11, 2026

(54) OPTICAL SENSING DEVICE

(71) Applicant: DENSO CORPORATION, Kariya-city (JP)

(72) Inventors: Kazuhisa Onda, Kariya-city (JP); Mitsuhiro Kiyono, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 282 days.

(21) Appl. No.: 18/581,467

(22) Filed: Feb. 20, 2024

(65) Prior Publication Data

US 2024/0192485 A1 Jun. 13, 2024

Related U.S. Application Data

(63) Continuation of application No. PCT/JP2022/032095, filed on Aug. 25, 2022.

(30) Foreign Application Priority Data

Sep. 10, 2021 (JP) ................................ 2021-147826

(51) Int. Cl.
*G02B 26/10* (2006.01)
*G01S 7/481* (2006.01)

(52) U.S. Cl.
CPC .......... *G02B 26/105* (2013.01); *G01S 7/4817* (2013.01)

(58) Field of Classification Search
CPC ........................... G02B 26/105; G01S 7/4817
See application file for complete search history.

(56) References Cited

U.S. PATENT DOCUMENTS

2005/0088748 A1* 4/2005 Otteman ............ G02B 27/0018 359/601
2018/0120424 A1* 5/2018 Eshel .................... G02B 26/10
2019/0049585 A1 2/2019 Gnan et al.
2020/0103500 A1 4/2020 Shand
2020/0292671 A1 9/2020 Wu et al.
2020/0355800 A1 11/2020 Toyama et al.
2022/0128664 A1 4/2022 Kano et al.
2023/0141377 A1* 5/2023 Ockenfuss ............ G02B 5/281 250/226

FOREIGN PATENT DOCUMENTS

JP S61-150533 A 7/1986
JP 2000-276300 A 10/2000
JP 2012-068120 A 4/2012

* cited by examiner

*Primary Examiner* — Lucy P Chien
(74) *Attorney, Agent, or Firm* — Posz Law Group, PLC

(57) ABSTRACT

An optical sensing device includes an optical unit and an accommodating unit. The accommodation unit includes an optical window portion which transmits the projected beam from the accommodation chamber to the detection area and transmits the reflected beam from the detection area to the accommodation chamber. The accommodation unit includes a holding portion which holds the optical window portion from a side of an outer periphery. The accommodation unit further includes an optical partition member which is arranged to partition between the optical unit and the optical window portion.

14 Claims, 25 Drawing Sheets

FIG. 4

DA
10
11
1
2
3
5
6
12
13
14
15a
15b
16
18
20
22
26
27a
27b
30
31
33
34a
34b
35
40
42
43a
43b
45
49
160
180
181, 182
182
183
184, 185
POA
ROA
X
Y
Z 10
1
12
16
18
14
181, 182
180
RB, RF
PB, PF
6
11
DR
3, 30
DA
26
27b
27a
42
43a
43b
PB
22
RB
45
49
POA
ROA
19
184, 185
20
2
40
15b
183
180
13
15a
6
X
Y
Z

Figure 16:
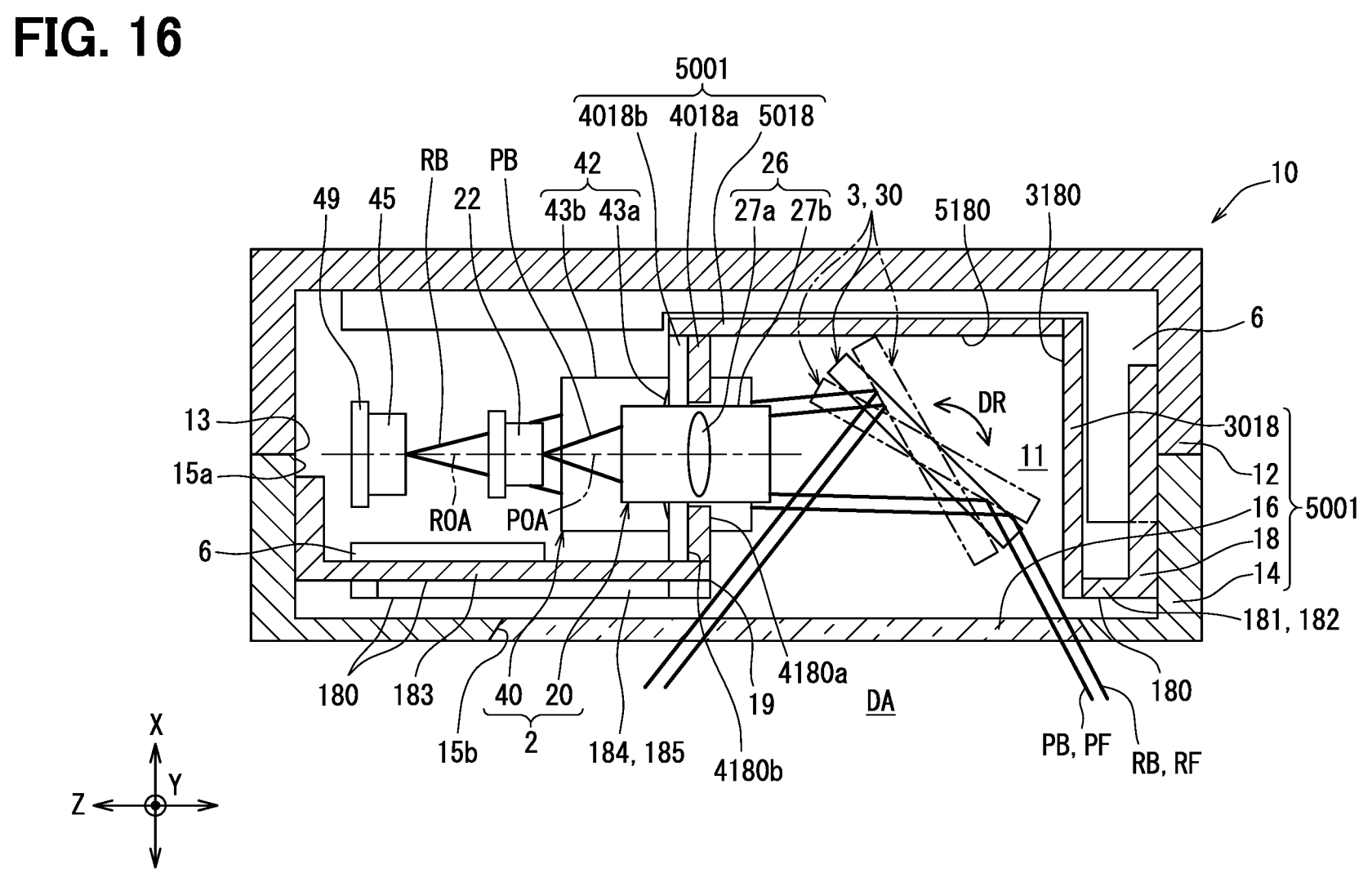

10
6
3018
12
16
18
14
5001
181, 182
180
RB, RF
PB, PF
3180
11
5180
DR
3, 30
DA
26
27a
27b
5018
4018a
4018b
42
43a
43b
4180a
19
4180b
184, 185
20
2
40
POA
PB
22
RB
ROA
45
49
15b
183
180
13
15a
6
X
Y
Z

FIG. 18

10
2001
6
12
16
2018
14
181, 182
180
RB, RF
PB, PF
11
DR
DA
3, 30
26
27a
27b
42
43a
43b
PB
22
RB
45
49
POA
ROA
19
183
180
20
40
2
15b
2186
184, 185
13
15a
6
X
Y
Z

FIG. 20

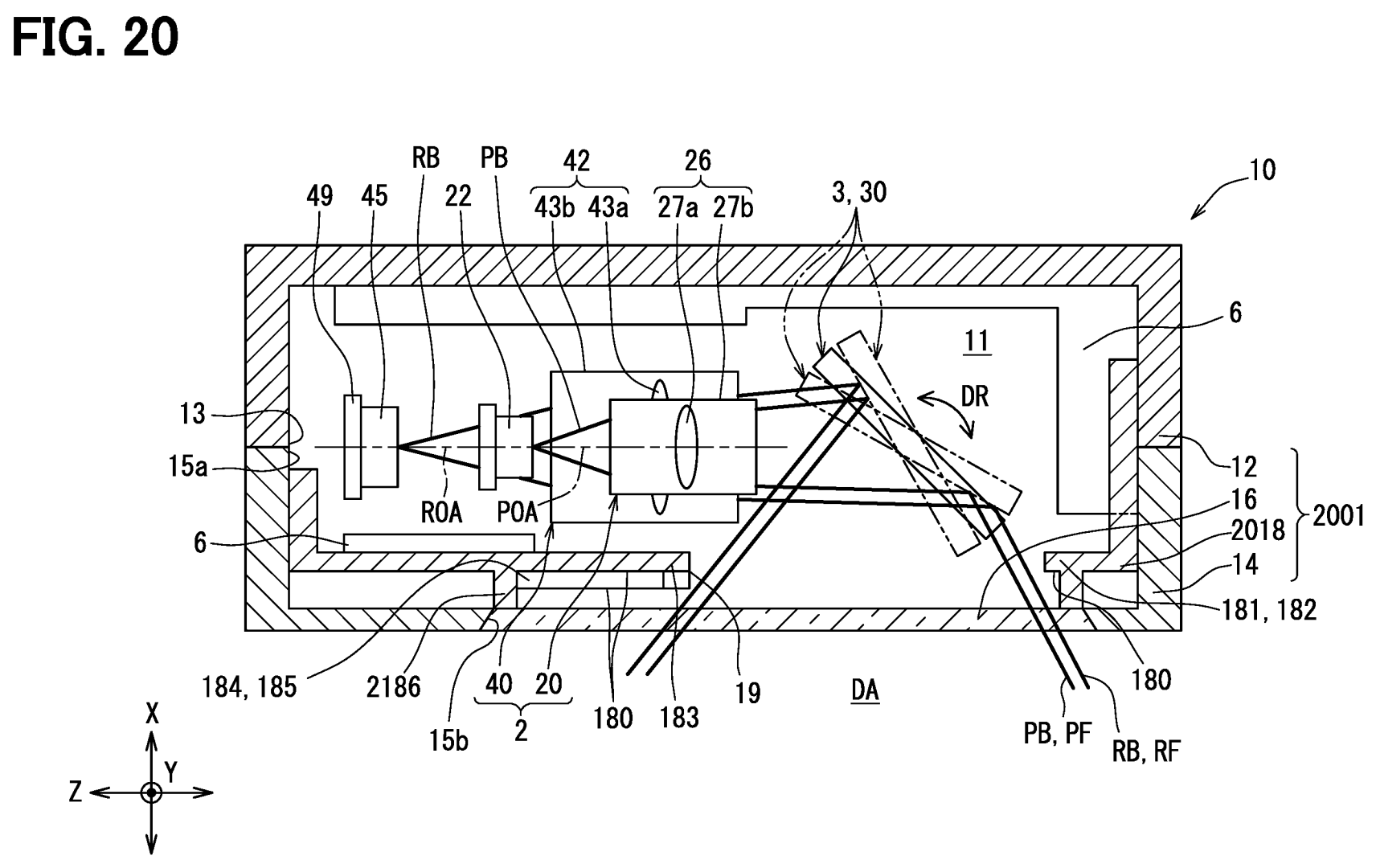

10
6
12
16
2018
14
181, 182
2001
180
RB, RF
PB, PF
11
DR
3, 30
DA
26
27a
27b
42
43a
43b
PB
22
RB
45
49
19
183
180
20
2
40
POA
ROA
15b
2186
184, 185
13
15a
6
X
Y
Z 10
6
12
16
18
14
4001
181, 182
180
RB, RF
PB, PF
11
DR
DA
3, 30
26
27a
27b
4001
4018a
4018b
42
43a
43b
PB
22
RB
45
49
POA
ROA
4180a
4180b
19
184, 185
20
40
2
15b
183
180
13
15a
6
X
Y
Z 10
6
12
16
18
14
4001
181, 182
180
RB, RF
PB, PF
11
DR
DA
3, 30
26
27a
27b
4001, 4018b
4180b
19
42
43a
43b
184, 185
PB
POA
20
40
2
22
ROA
RB
15b
183
45
49
180
13
15a
6
X
Y
Z

OPTICAL SENSING DEVICE

CROSS REFERENCE TO RELATED APPLICATIONS

The present application is a continuation application of International Patent Application No. PCT/JP2022/032095 filed on Aug. 25, 2022, which designated the U.S. and is based on and claims the benefit of priority from Japanese Patent Application No. 2021-147826 filed on Sep. 10, 2021, and all the contents of the application are incorporated by reference.

TECHNICAL FIELD

The present disclosure relates to an optical sensing device.

BACKGROUND

Optical sensing devices scan a detection area with a projected beam and detect a reflected beam from the detection area. In this arrangement, noise light may lower an accuracy and cause false detections. In the above aspects, or in other aspects not mentioned, there is a need for further improvements in an optical sensing device.

SUMMARY

According to an aspect of the present disclosure, an optical sensing device, which scans a projected beam toward an outside detection area and detests a reflected beam from the detection area with respect to the projected beam, the optical sensing device comprising:

- an optical unit including a light projecting portion that projects the projected beam, and a light receiving portion that receives the reflected beam of which a footprint of an optical path overlaps with that of the projected beam; and
- an accommodation unit which forms an accommodation chamber accommodating the optical unit therein, wherein
- the accommodation unit includes:
- an optical window portion which transmits the projected beam from the accommodation chamber to the detection area and transmits the reflected beam from the detection area to the accommodation chamber;
- a holding portion which holds the optical window portion from a side of an outer periphery; and
- an optical partition member, in which a reflectance rate to the projected beam is lower than that of the holding portion on a side of the optical window portion and an absorptance rate to the projected beam is higher than that of the holding portion on a side of the optical window portion, is arranged to partition between the optical unit and the optical window portion.

As described above, according to one aspect of the present disclosure, the footprints of the optical paths of the projected beam projected from the light projecting portion and the reflected beam received by the light receiving portion overlap. According to this, in the optical unit accommodated in the accommodation chamber formed by the accommodation unit, the light projecting portion and the light receiving portion may be arranged as close as possible in the direction in which the footprints overlap. Therefore, it is possible to reduce the size of the accommodation unit and downsize the optical sensing device as a whole.

Furthermore, according to one aspect, the optical window portion, which transmits the projected beam from the accommodation chamber to the detection area and transmits the reflected beam from the detection area to the accommodation chamber in the accommodation unit, is surrounded by the holding portion and held from a side of the outer periphery. Therefore, in the accommodation unit, the optical partition member, in which a reflectance rate to the projected beam is lower than that of the holding portion 14 on a side of the optical window portion and an absorptance rate to the projected beam is higher than that of the holding portion on a side of the optical window portion, is arranged to partition between the optical unit and the optical window portion.

According to the arrangement of the partition member in an embodiment, noise light generated when the projected beam is reflected by the optical window portion is blocked by the optical partition member, it is possible to restrict a direct intrusion to the optical unit. In addition, it is possible to restrict indirect intrusion of the noise light to the optical unit through reflection or scattering by elements surrounding the optical unit in the accommodation chamber by being blocked by the optical partition member. For these reasons, in one aspect, it is possible to ensure detection accuracy by achieving both of downsizing and suppressing erroneous detection caused by the intrusion of noise light.

BRIEF DESCRIPTION OF DRAWINGS

FIG. 4 is a schematic diagram corresponding to a cross-sectional view along a line IV-IV in FIG. 3.

FIG. 13 is a schematic diagram of an optical sensing device according to a second embodiment, corresponding to FIG. 6.

FIG. 14 is a schematic diagram of an optical sensing device according to a third embodiment, corresponding to FIG. 6.

FIG. 15 is a schematic diagram of an optical sensing device according to a fourth embodiment, corresponding to FIG. 6.

FIG. 16 is a schematic diagram of an optical sensing device according to a fifth embodiment, corresponding to FIG. 6.

FIG. 18 is a schematic diagram of an optical sensing device according to a modified embodiment, corresponding to FIG. 6.

FIG. 20 is a schematic diagram of an optical sensing device according to a modified embodiment, corresponding to FIG. 6.

DETAILED DESCRIPTION

There are optical sensing devices that scan a projected beam toward a detection region in an outside and detect a reflected beam from the detection region with respect to the projected light beam. For example, in the optical sensing device disclosed in JP2019-132723A, a partition plate that blocks light transmission is disposed between a light projecting portion that projects a projected beam and a light receiving portion that receives a reflected beam. This makes it possible to suppress false detections due to light leakage from the light projecting portion to the light receiving portion.

However, the optical sensing device disclosed in JP2019-132723A requires an arranging space for arranging the light projecting portion and the light receiving portion in a separated manner to sandwich the partition plate between them and increases an overall size of the device.

It is an object of the present disclosure to provide an optical sensing device that achieves both downsizing and ensuring detection accuracy.

Hereinafter, technical solutions of the present disclosure for achieving the objects is described.

Hereinafter, multiple embodiments will be described with reference to the drawings. In the following description, the same reference symbols are assigned to corresponding components in each embodiment in order to avoid repetitive descriptions. When only a part of the configuration is described in the respective embodiments, the configuration of the other embodiments described before may be applied to other parts of the configuration. Further, not only the combinations of the configurations explicitly shown in the description of the respective embodiments, but also the configurations of the plurality of embodiments can be partially combined together even if the configurations are not explicitly shown if there is no difficulty in the combination in particular.

First Embodiment

As shown in FIGS. 1 to 6, an optical sensing device 10 according to the first embodiment of the present disclosure is LiDAR (Light Detection and Ranging/Laser Imaging Detection and Ranging) which optically observing an outside of a moving object. The optical sensing device 10 is mounted on a vehicle such as a car that is capable of at least one type of operation among manual operation, automatic operation, and remote operation as a moving object. In the following description, unless otherwise specified, each direction indicated by the front, the rear, the top, the bottom, the left, and the right is defined with respect to the vehicle on a horizontal plane. Further, the horizontal direction and the vertical direction refer to a direction parallel to and perpendicular to the horizontal plane of a vehicle on the horizontal plane, respectively.

Figure 4:
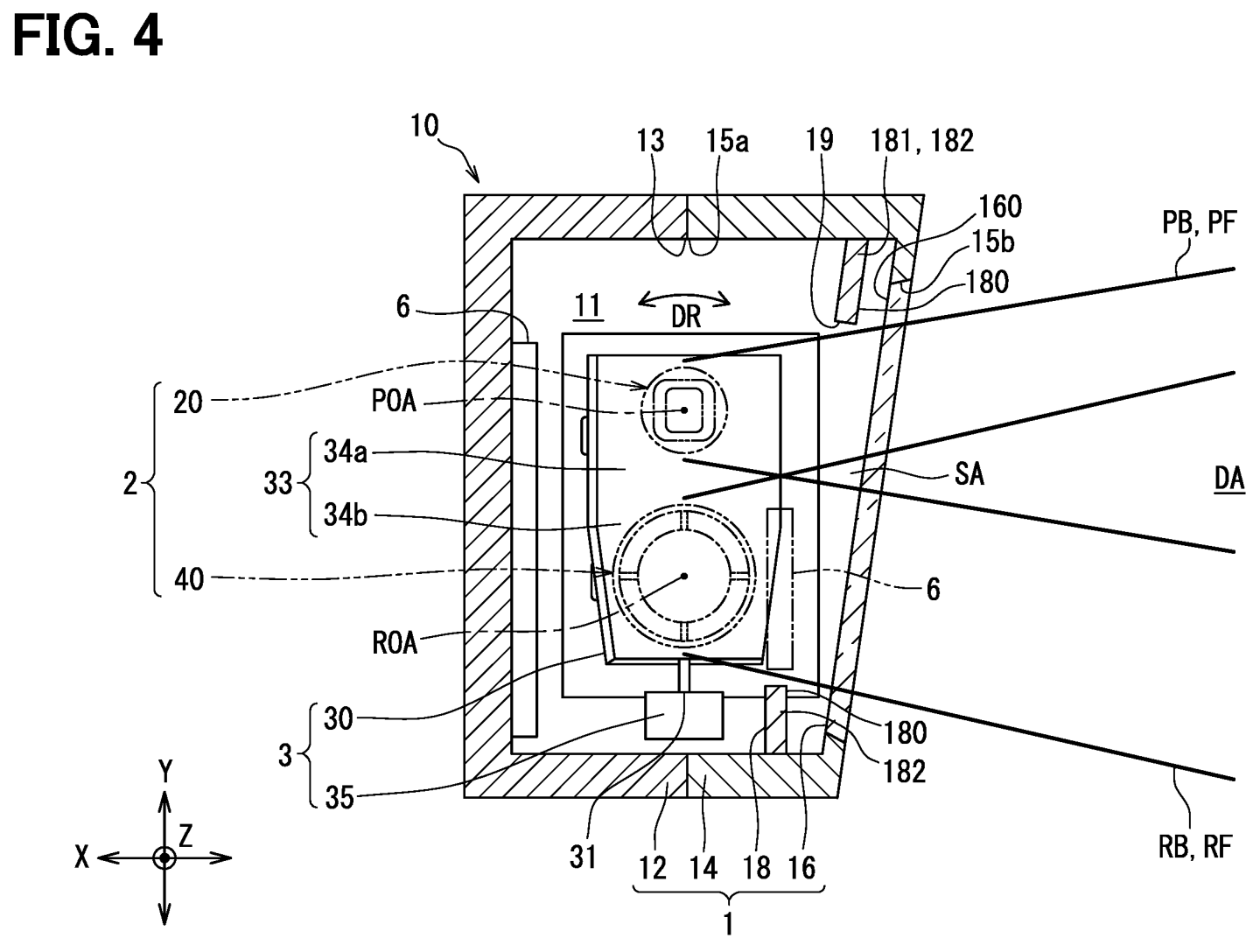
Figure 6:
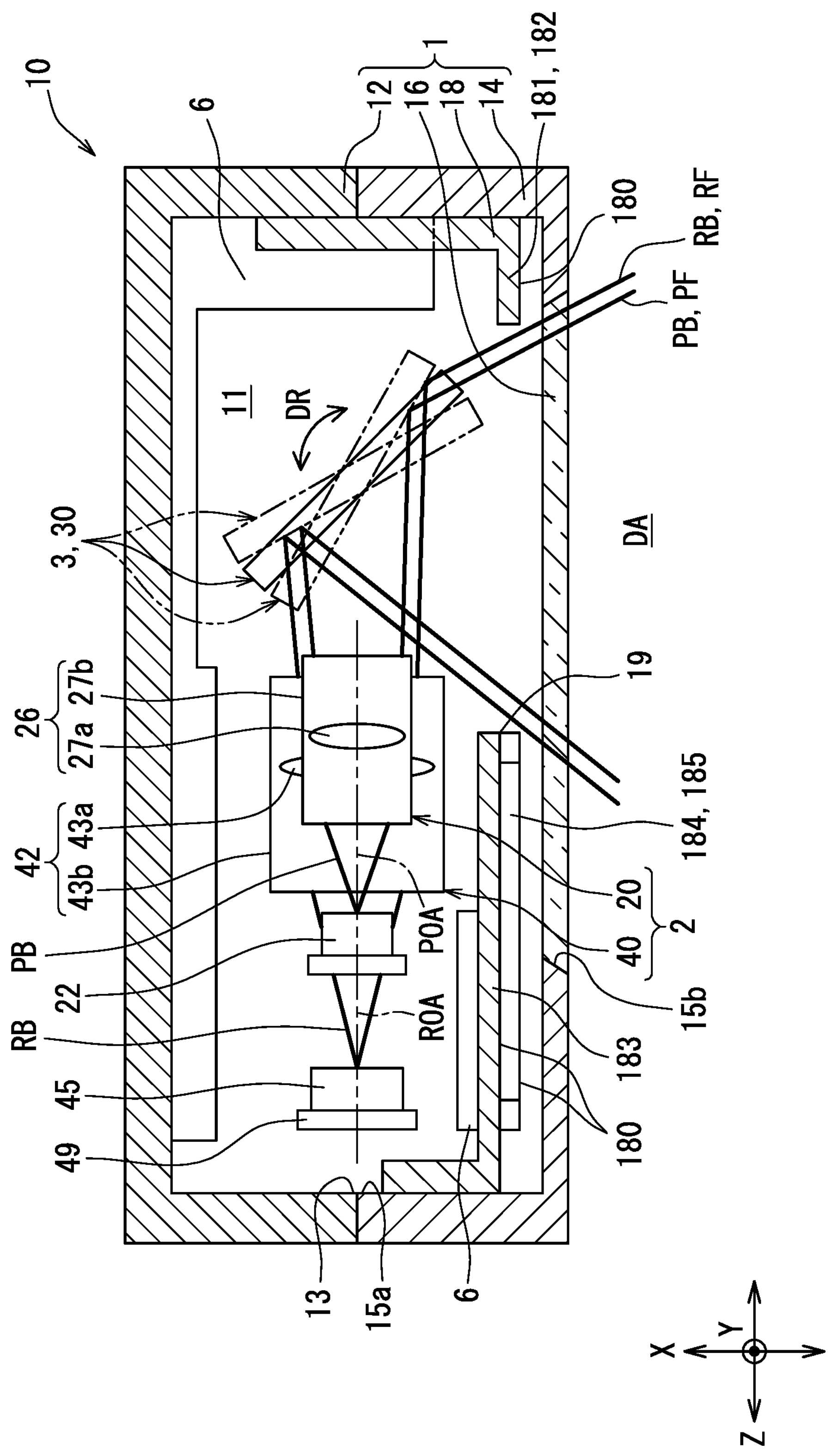
FIG. 6 is a schematic diagram corresponding to a sectional view along a line VI-VI in FIG. 3.

The optical sensing device 10 is disposed at least one location in the vehicle, for example, among a front portion, a side portion on a left or a right, a rear portion, an upper roof, and the like. As shown in FIGS. 4 and 6, the optical sensing device 10 scans a projected beam PB toward a detection area DA, corresponding to a disposed location, in the outside of the vehicle. The optical sensing device 10 detects a return light that is returned when the projected beam PB is reflected by a target in the detection area DA, as a reflected light beam RB. Light in the near-infrared region, which is difficult for people outside to see, is normally selected as the projected beam PB, which becomes the reflected beam RB.

The optical sensing device 10 observes the target in the detection area DA by detecting the reflected light beam RB. Observation of the target here refers to at least one of, for example, a distance from the optical sensing device 10 to the target, a direction in which the target exists, and a reflection intensity of the reflected light beam RB from the target. A typical target to be observed in the optical sensing device 10 applied to a vehicle may be at least one type of moving object such as a pedestrian, a cyclist, an animal other than a human, or another vehicle. A typical target to be observed in the optical sensing device 10 applied to a vehicle is at least one type of stationary object such as a guardrail, a road sign, a structure on a roadside, or a fallen object on the road.

As shown in FIGS. 1 to 6, in the optical sensing device 10, a three-dimensional orthogonal coordinate system is defined by three axes: an X-axis, a Y-axis, and a Z-axis. In the optical sensing device 10, the Y-axis direction in particular is defined along the vertical direction of the vehicle. At the same time, in the optical sensing device 10, the X-axis direction and the Z-axis direction, which are both orthogonal to the Y-axis direction and mutually orthogonal, are defined along the horizontal direction of the vehicle.

The optical sensing device 10 includes an accommodation unit 1, an optical unit 2, a scanning unit 3, a control unit 5, and an auxiliary unit 6. The accommodation unit 1 includes a casing portion 12, a holding portion 14 and an optical window portion 16 for defining an accommodation chamber 11 in which these elements 1 to 3, 5, and 6 are accommodated.

The casing portion 12 is mainly made of a base material such as metal or synthetic resin and is formed into a bottomed cup shape as a whole. At least one of the exterior surface and the interior surface of the casing portion 12 is provided with light-shielding properties by settings a low transmittance rate and a high absorptance rate as optical properties for light in the near-infrared region and the visible region.

Figure 5:
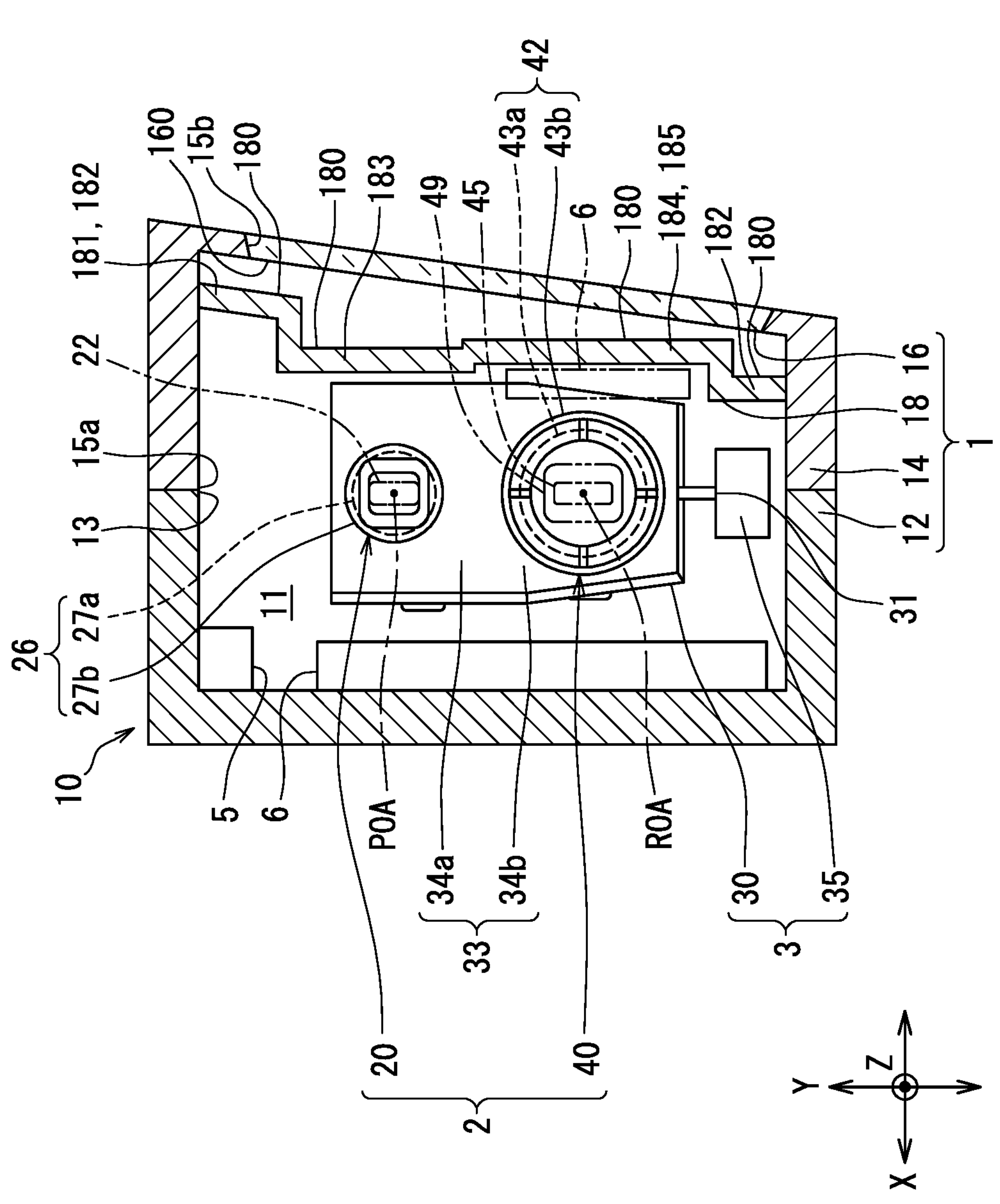
FIG. 5 is a schematic diagram corresponding to a cross-sectional view along a line V-V in FIG. 3.

As shown in FIGS. 4 to 6, the casing portion 12 has a casing opening 13 that opens toward one side in the X-axis direction. The casing portion 12 forms the accommodation chamber 11 together with the holding portion 14 and the optical window portion 16 by covering the casing opening 13 with the holding portion 14 and the optical window portion 16 from one side in the X-axis direction. This accommodation chamber 11 is provided in common to the light projecting portion 20 and the light receiving portion 40 that constitute the optical unit 2.

As shown in FIGS. 1 to 6, the holding portion 14 is mainly made of a base material such as metal or synthetic resin and is formed into a cylindrical frame shape as a whole. In the holding portion 14, a light-shielding property is provided for a light-shielding surface composed of at least one of the exterior surface and the interior surface and the inner surface of the opening by being set with a low transmittance rate and a high absorptance rate as optical characteristics for light in the near-infrared region and the visible region.

Figure 1:
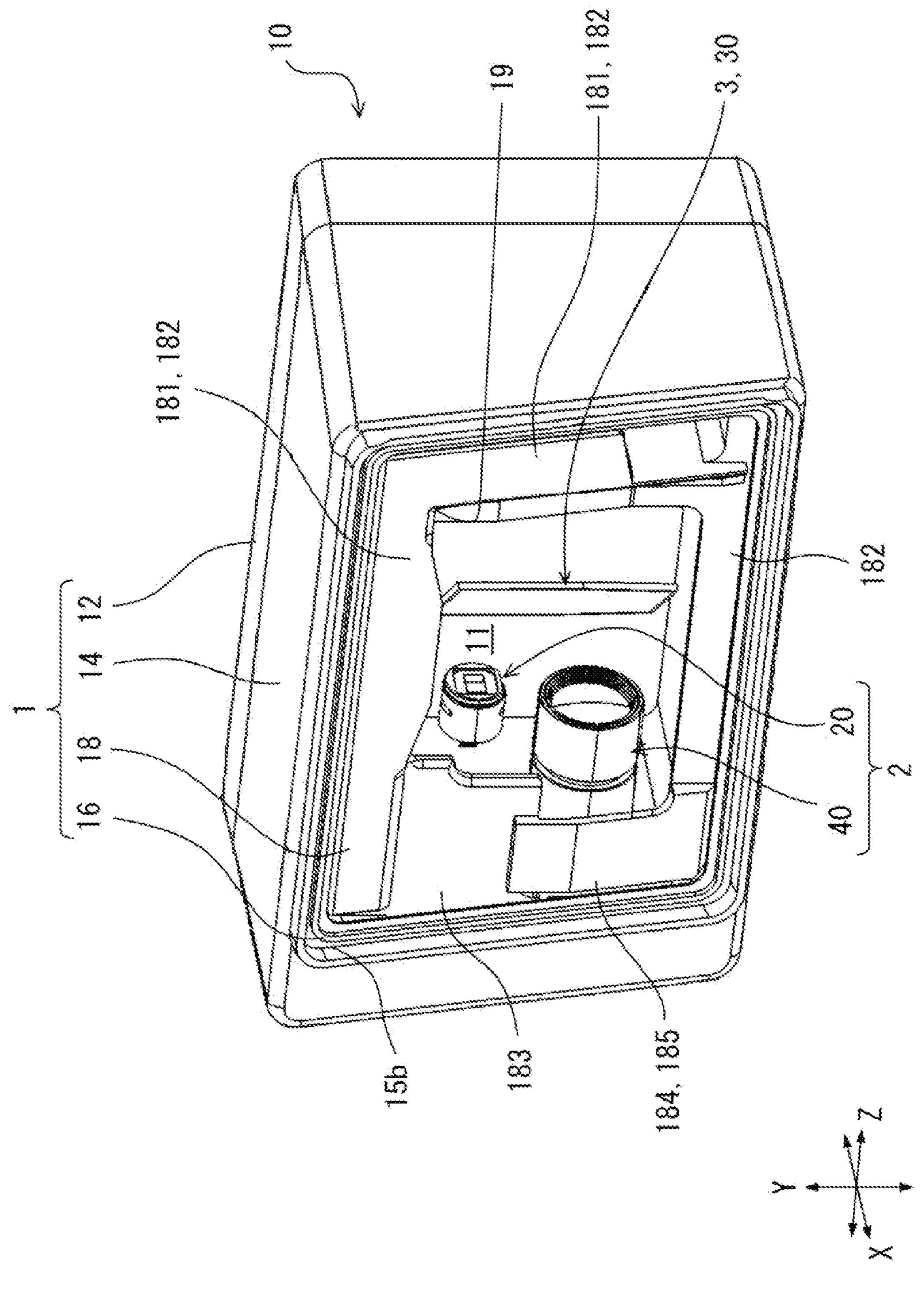
FIG. 1 is a perspective view of an optical sensing device according to a first embodiment.
Figure 2:
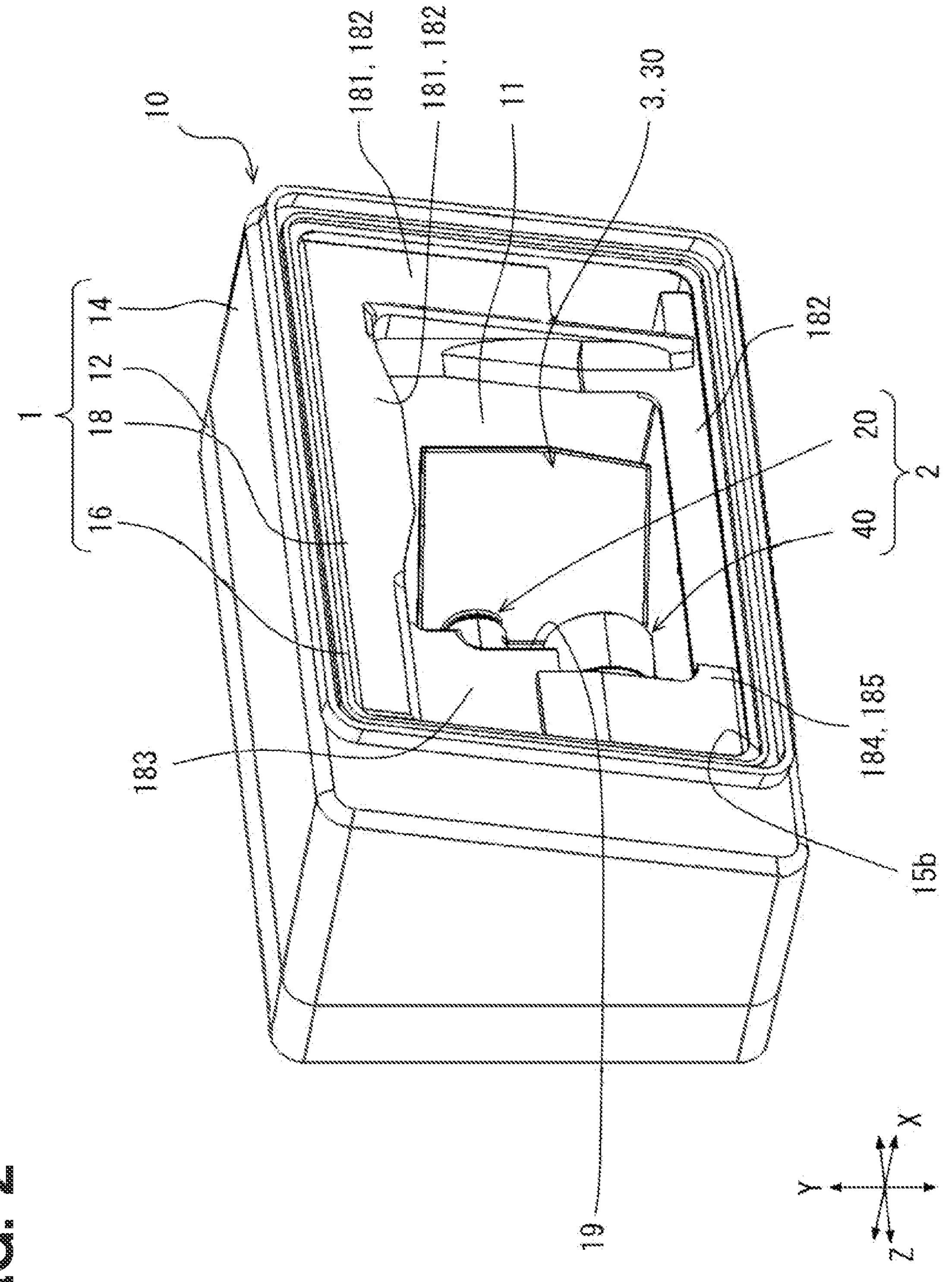
FIG. 2 is a perspective view of the optical sensing device according to the first embodiment.
Figure 3:
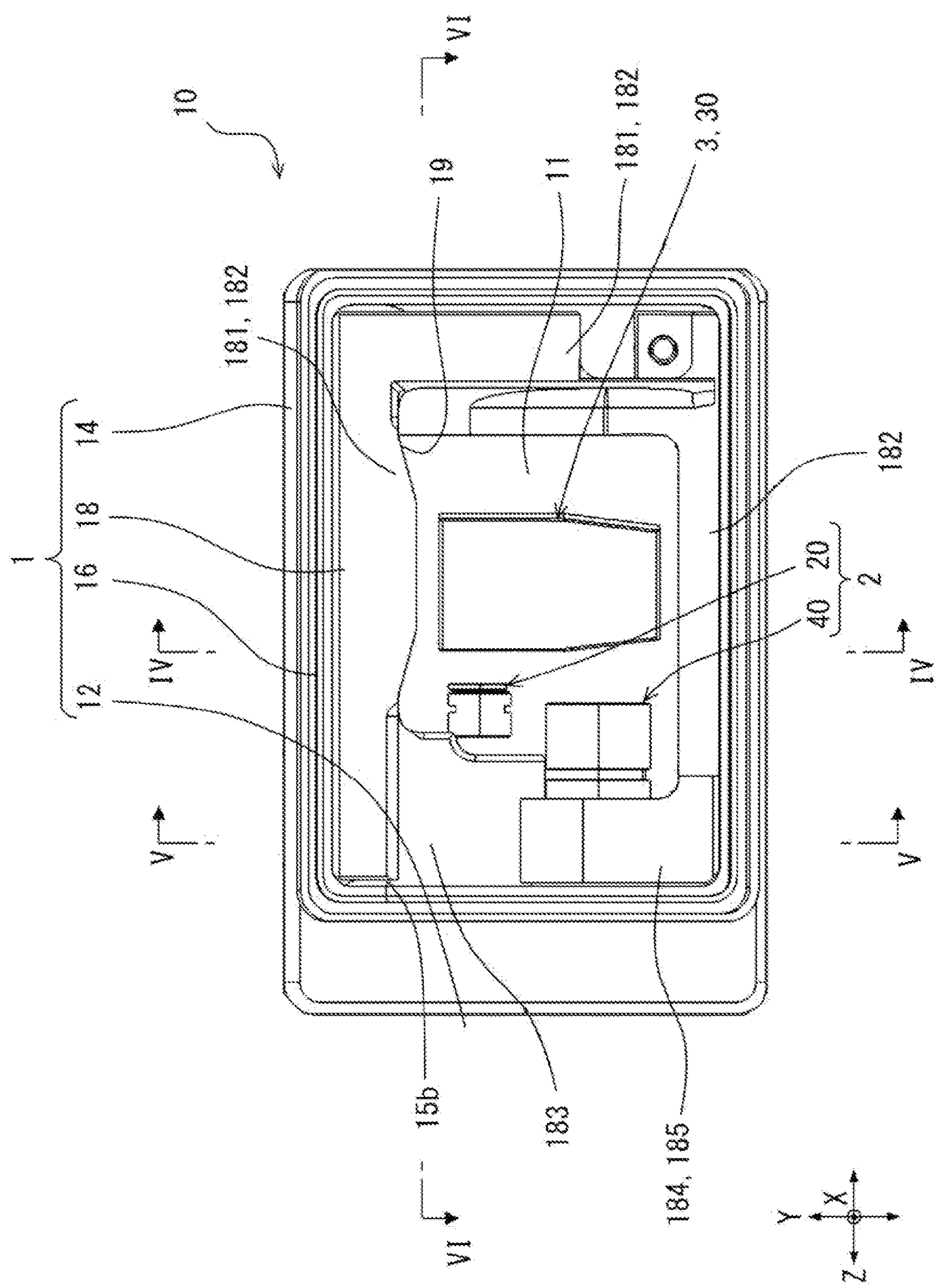
FIG. 3 is a front view of the optical sensing device according to the first embodiment.

As shown in FIGS. 4 to 6, the holding portion 14 has an assembly opening 15*a* and an optical opening 15*b* that open toward one side and the other side in the X-axis direction, respectively. An outer peripheral side edge surrounding the assembly opening 15*a* in the holding portion 14 is assembled and fixed to the outer peripheral side edge surrounding the casing opening 13 in the casing portion 12 by screwing, as shown in FIGS. 1 to 3. The size of the optical opening 15*b* in the holding portion 14 is designed to be smaller than the size of the assembly opening 15*a* in the Z-axis direction. As a result, the geometric center of the optical aperture 15*b* is substantially aligned with the geometric center of the optical window portion 16 held by the holding portion 14 described later, but it may be deflected to the geometric center of the optical window portion 16.

As shown in FIGS. 1 to 6, the optical window portion 16 is formed into a substantially rectangular flat plate shape as a whole, mainly made of a base material such as synthetic resin or glass. The optical window portion 16 is provided with light-transmitting properties by setting high transmittance rate and low absorptance rate as optical characteristics for light in the near-infrared region. The optical window portion 16 may be set with a high transmittance rate for light in the near-infrared region and a high transmittance rate for light in the visible region, for example by coloring a base material, forming an optical thin film, pasting a film on a surface of the base material, or the like.

As shown in FIGS. 4 to 6, the outer peripheral side edge portion of the optical window portion 16 is fixed to the inner peripheral side edge portion surrounding the optical opening 15*b* among the holding portion 14 in a state coming into contact with each other over a whole periphery, e.g., by adhesive or the like. An interior surface on a side of the accommodation chamber 11 and an exterior surface on a side of the detection area DA on the optical window portion 16 are inclined at substantially the same angle with respect to the Y-axis direction. The optical window portion 16 is surrounded from a side of the outer periphery by the holding portion 14 and held in an inclined state to close the optical opening 15*b*. This arrangement makes the optical window portion 16 possible to transmit the projected beam PB from the accommodation chamber 11 to the detection area DA, to transmit the reflected beam RB from the detection area DA to the accommodation chamber 11, and to control an intrusion of foreign substances from a side of the detection area DA to an inside of the accommodation chamber 11.

As shown in FIGS. 1 to 6, the optical unit 2 includes a light projecting portion 20 and a light receiving portion 40. Hereinafter, in order to facilitate understanding of the explanation, the light projecting portion 20 is explained first, and the light receiving portion 40 is explained after the scanning unit 3.

As shown in FIGS. 5 and 6, the light projecting portion 20 includes a light projector 22 and a light-projecting lens system 26. The light projector 22 emits a near-infrared laser beam that becomes the projected beam PB. The light projector 22 is arranged within the accommodation chamber 11 and held by the casing portion 12.

Figure 7:
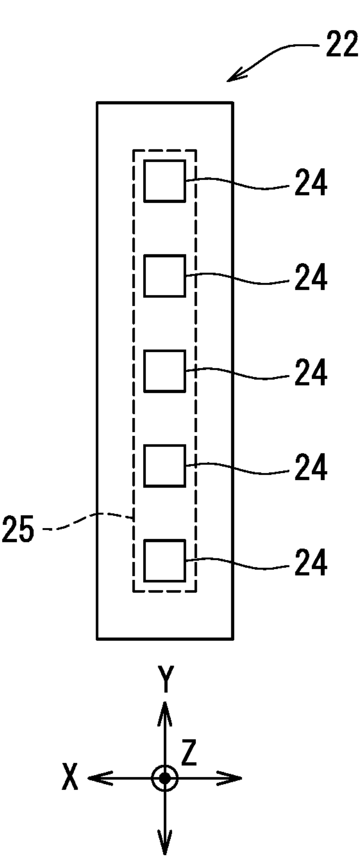
FIG. 7 is a schematic diagram of a light projector according to the first embodiment.

As shown in FIG. 7, the light projector 22 is constructed by arranging a plurality of laser oscillation elements 24 in an array on a substrate. Each laser oscillation element 24 is arranged in a single row along the Y-axis direction. Each laser oscillation element 24 has a resonator structure that resonates the laser beam oscillated in the PN junction layer, and a mirror layer structure that repeatedly reflects the laser beam with the PN junction layer in between, to emit a coherent laser beam with a uniform phase. Each laser oscillation element 24 generates pulsed laser light which is a part of the projected beam PB in accordance with a control signal from the control unit 5.

The light projector 22 has a light projection aperture 25 defined by a pseudo rectangular outline formed on one side of the substrate. The light projection aperture 25 is configured as a collection of laser oscillation apertures in each laser oscillation element 24. The aspect ratio of the light projection aperture 25 is set such that the long side is along the Y-axis direction, and the short side is along the X-axis direction.

As shown in FIGS. 4 and 6, the laser light projected from the laser oscillation aperture of each laser oscillation element 24 is projected from the light projection aperture 25 shown in FIG. 7 as the projected beam PB, which is simulated as a line having a longitudinal line in the Y-axis direction in the detection area DA. The projected beam PB may include a non-light-emitting portion corresponding to an arrangement interval of the laser oscillation elements 24 in the Y-axis direction. Even in this case, it is preferable to form a line-shaped projected beam PB in which the non-light-emitting portion is macroscopically eliminated in the detection area DA due to the diffraction effect.

The light-projecting lens system 26 shown in FIGS. 5 and 6 projects the projected beam PB from the light projector 22 toward the mirror portion 30 of the scanning unit 3. The light-projecting lens system 26 is arranged in the accommodation chamber 11 between the light projector 22 and the mirror portion 30 in the Z-axis direction.

The light-projecting lens system 26 demonstrates at least one type of optical function among, for example, condensing, collimating, shaping, and the like. The light-projecting lens system 26 forms a light projection optical axis POA along the Z-axis direction. The light-projecting lens system 26 is constructed such that at least one light projection lens 27*a* is held by the casing portion 12 via a lens barrel 27*b*.

At least one light projection lens 27*a* is mainly made of a light-transmitting base material such as synthetic resin or glass and is formed into a lens shape according to the optical effect to be exerted. The light projection optical axis POA is defined, e.g., as a virtual optical axis passing through the center of curvature of the lens surface of at least one projection lens 27*a*. A principal ray of the projected beam PB, which is to be emitted from a center of the light projection aperture 25 described above is subjected to an optical action from the light-projecting lens system 26 and is guided along the light projection optical axis POA as shown in FIG. 6.

As shown in FIGS. 4 to 6, the scanning unit 3 is configured to include the mirror portion 30 and a motor portion 35. The mirror portion 30 scans the projected beam PB projected from the light-projecting lens system 26 of the light projecting portion 20 toward the detection area DA and reflects the reflected beam RB from the detection area DA with respect to the projected beam PB toward the light-receiving lens system 42 of the light receiving portion 40.

In the accommodation chamber 11, the mirror portion 30 is arranged to be shifted to one side in the Z-axis direction from the light-projecting lens system 26 and the light-receiving lens system 42 that constitute the optical unit 2. At the same time, the mirror portion 30 is disposed within the accommodation chamber 11 so as to be shifted from the optical window portion 16 to one side in the X-axis direction. The mirror portion 30 is formed into a flat plate shape as a whole, mainly made of a base material such as synthetic resin or glass. In the mirror portion 30, a reflective film of aluminum, silver, gold, or the like is deposited on one side of the base material, so that the reflective surface 33 is formed in a mirror-like shape as shown in FIGS. 4 and 5.

The mirror portion 30 has a rotary shaft 31 that is arranged within the accommodation chamber 11 in a rotatable manner. The normal direction of the reflective surface 33 is arranged to be adjustable around a rotation center line by rotating the mirror portion 30 around the rotation center line of the rotary shaft 31 extending along the Y-axis direction. The mirror portion 30 is allowed to swing within a limited drive range DR, e.g., by a mechanical or electrical stopper. Thereby, the projected beam PB reflected by the mirror portion 30 is restricted so as not to deviate from the optical window portion 16.

As shown in FIGS. 4 to 6, the mirror portion 30 is provided in common to the light projecting portion 20 and the light receiving portion 40. That is, the mirror portion 30 is provided in common for the projected beam PB and the reflected beam RB. As a result, the mirror portion 30 has a projected light reflecting portion 34*a* used for projecting the projected beam PB and a reflected light reflecting portion 34*b* used for receiving the reflected beam RB shifted in the Y-axis direction on the reflecting surface 33.

As shown in FIGS. 4 and 6, the projected beam PB is transmitted through the optical window portion 16 temporally and spatially scan the detection area DA by being reflected by the projected light reflecting portion 34*a* whose normal direction is adjusted according to a rotational movement of the mirror portion 30. Scanning motion of the projected beam PB with respect to the detection area DA is substantially limited to scanning in the horizontal direction according to the rotational movement of the mirror portion 30. Thereby, the drive range DR of the mirror portion 30 defines the horizontal angle of view in the detection area DA.

The projected beam PB becomes the reflected beam RB that returns to the optical sensing device 10 by being reflected by the target present in the detection area DA. The reflected beam RB passes through the optical window portion 16 again and enters the reflected light reflecting portion 34*b* of the mirror portion 30. Here, the speeds of the projected beam PB and the reflected beam RB are sufficiently large relative to a rotational speed of the mirror portion 30. As a result, the reflected beam RB is guided to the light-receiving lens system 42 of the light receiving portion 40 in a direction opposite to the projected beam PB by receiving a reflection effect from the reflected light reflection portion 34*b* of the mirror portion 30, which can be simulated to have substantially the same rotation angle as the projected beam PB.

The footprint PF of the optical path formed by the projected beam PB and the footprint RF of the optical path formed by the reflected beam RB define an overlapping area SA that partially overlaps in the Y-axis direction and within any rotational angle of the mirror portion 30 within the driving range DR. In particular, the footprint PF of the projected beam PB and the footprint RF of the reflected beam RB are designed to overlap on at least one of surfaces on a side of the accommodation chamber 11 and a side of the detection area DA, where the projected beam PB and reflected beam RB enter, of the optical window portion 16. Here, the footprints PF and RF mean spatial regions in which optical paths serving as trajectories of the beams PB and RB contributing to detection, respectively, can be formed in accordance with the rotation of the mirror portion 30.

As shown in FIGS. 4 and 5, the motor portion 35 is arranged around the mirror portion 30 within the accommodation chamber 11. The motor portion 35 is, e.g., a voice coil motor, a DC motor with brushes, a stepping motor, or the like. An output shaft of the motor portion 35 is coupled to a rotary shaft 31 of the mirror portion 30 directly or indirectly via a drive mechanism such as a speed reducer. The motor portion 35 is held by the casing portion 12 so as to be able to perform a rotational movement of the rotary shaft 31 together with the output shaft. The motor portion 35 performs a rotational movement of the mirror portion 30 within a drive range DR in accordance with a control signal from the control unit 5.

As shown in FIGS. 5 and 6, the light receiving portion 40, which constitutes the optical unit 2 together with the above-mentioned light projecting portion 20, includes a light-receiving lens system 42 and a light receiver 45. The light-receiving lens system 42 focuses the reflected beam RB reflected by the mirror portion 30 toward the light receiver 45. The light-receiving lens system 42 is arranged in the accommodation chamber 11 between the light receiver 45 and the mirror portion 30 in the Z-axis direction. The light-receiving lens system 42 is positioned below the light-projecting lens system 26 in the Y-axis direction.

The light-receiving lens system 42 demonstrates an optical function so as to form an image of the reflected beam RB on the light receiver 45. The light-receiving lens system 42 forms a light receiving optical axis ROA along the Z-axis direction. The light-receiving lens system 42 is constructed such that at least one light receiving lens 43*a* is held by the casing portion 12 via a lens barrel 43*b*.

At least one light receiving lens 43*a* is mainly made of a light-transmitting base material such as synthetic resin or glass and is formed into a lens shape according to the optical effect to be exerted. The light receiving optical axis ROA is defined, e.g., as a virtual light axis passing through the center of curvature of the lens surface of at least one light receiving lens 43*a*. The light-receiving optical axis ROA of the light-receiving lens system 42 is shifted in the Y-axis direction with respect to the light projection optical axis POA of the light-projecting lens system 26. The maximum diameter of the lens barrel 43*b* constituting the outermost shell of the light-receiving lens system 42 protrude wider in both sides in the X-axis direction including a side of the optical window portion 16 than the maximum diameter of the lens barrel 43*b* constituting the outermost shell of the light-projecting lens system 26.

A principal ray of the reflected beam RB reflected from the reflected light reflecting portion 34*b* of the mirror portion 30 is subjected to an optical action from the light-receiving lens system 42 at an arbitrary rotation angle within the driving range DR and is guided along the light receiving optical axis ROA as shown in FIG. 6. That is, the light-receiving optical axis ROA along which the reflected beam RB follows is defined as an optical axis along which the reflected beam RB follows over the drive range DR of the mirror portion 30 which is driven in a rotational manner.

The light receiver 45 shown in FIGS. 5 and 6 outputs a detection signal by receiving the reflected beam RB imaged by the light-receiving lens system 42. The light receiver 45 is arranged within the accommodation chamber 11 and held by the casing portion 12.

Figure 8:
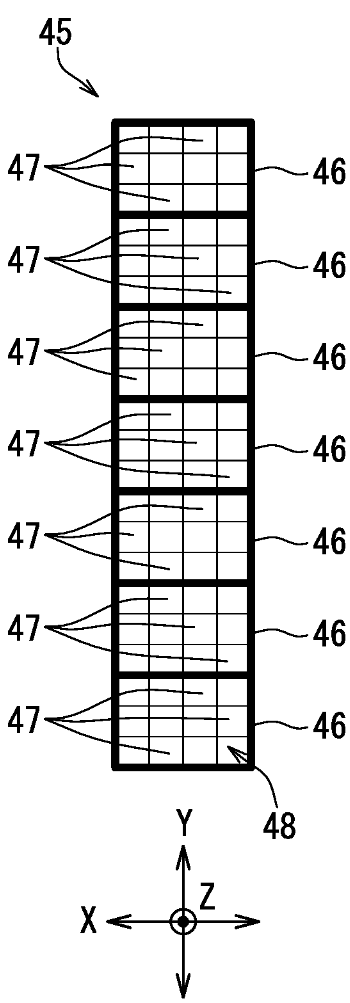
FIG. 8 is a schematic diagram of a light receiver according to the first embodiment.
Figure 9:
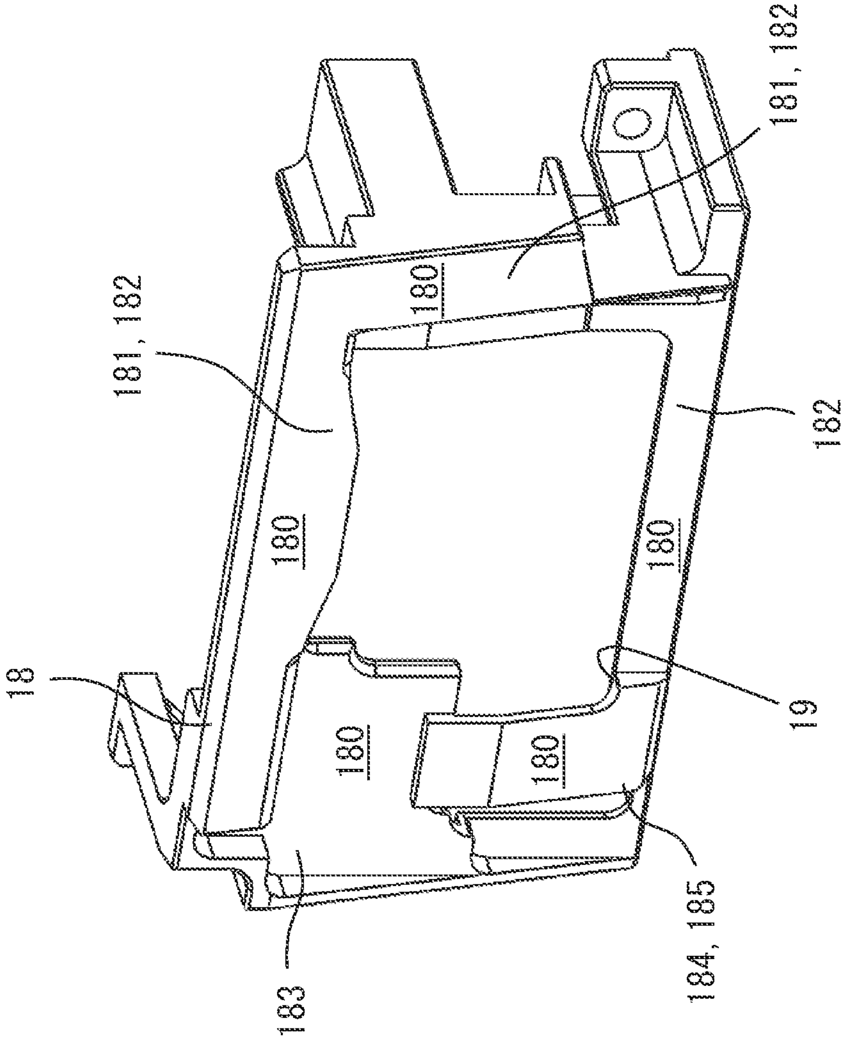
FIG. 9 is a perspective view of an optical partition member according to the first embodiment.
Figure 10:
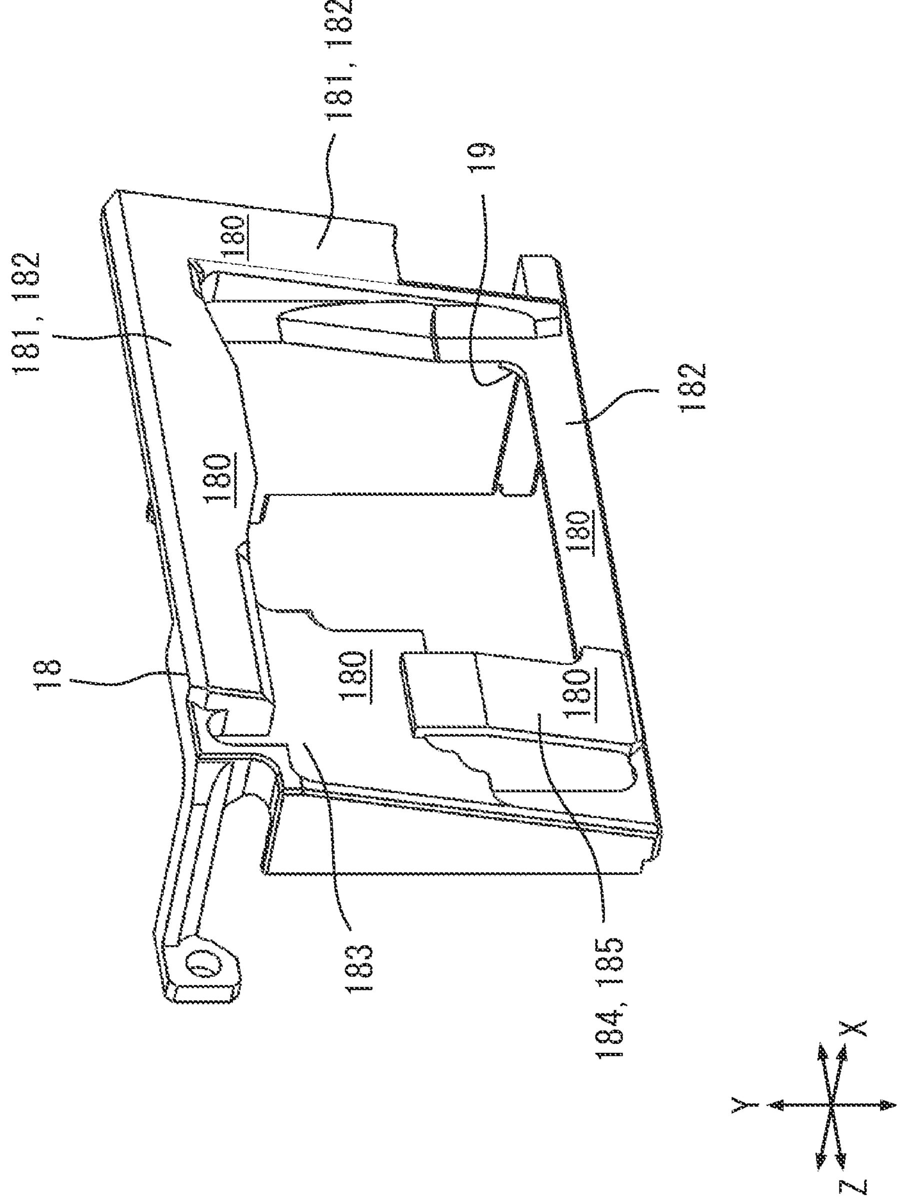
FIG. 10 is a perspective view of the optical partition member according to the first embodiment.

As shown in FIG. 8, the light receiver 45 is constructed by arranging a plurality of light receiving pixels 46 in an array on a substrate. The light receiving pixels 46 are arranged in a single row along the Y-axis direction. Each light receiving pixel 46 has a plurality of light receiving elements 47. That is, since there are a plurality of light receiving elements 47 for each light receiving pixel 46, an output value differs depending on the number of responses of these light receiving elements 47. Therefore, a plurality of light receiving elements 47 for each light receiving pixel 46 are bunded to generate output, it is possible to increase the dynamic range.

The light receiving elements 47 of each light receiving pixel 46 are formed mainly of a photodiode such as a single photon avalanche diode (SPAD), for example. The light receiving elements 47 of each light receiving pixel 46 may be integrally constructed by stacking a micro lens array in front of the photodiode array. Note that in FIG. 8, some of the symbols indicating the light receiving elements 47 are omitted.

The light receiver 45 has a light receiving surface 48 with a rectangular outline on one side of the substrate. The light receiving surface 48 is configured as a collection of incident surfaces of each light receiving pixel 46. Each light receiving pixel 46 receives and detects the reflected beam RB that has entered the incident surface constituting the light receiving surface 48 by using respective light receiving elements 47. Here, the reflected beam RB becomes a beam that spreads out in a line shape, corresponding to the projected beam PB that is simulated in a line shape in the detection area DA. Therefore, the aspect ratio of the light receiving surface 48 is set such that the long side runs along the Y-axis direction, and the short side runs along the X-axis direction or an inclined direction thereof.

As shown in FIGS. 5 and 6, the light receiver 45 integrally includes a decoder 49. The decoder 49 sequentially reads out electric pulses generated by each light receiving pixel 46 in response to the detection of the reflected beam RB by sampling processing. The decoder 49 outputs the sequentially read electric pulses to the control unit 5 as detection signals.

The control unit 5 shown in FIG. 5 is arranged on at least one position among the surroundings of the optical unit 2 and the surroundings of the scanning unit 3 in the accommodation chamber 11. The control unit 5 controls observation of the target in the detection area DA. The control unit 5 mainly includes at least one of a computer including a processor and a memory. The control unit 5 is electrically connected to the light projector 22, the motor portion 35, and the light receiver 45.

The control unit 5 outputs a control signal to the light projector 22 so that the projected beam PB is generated by oscillation of each laser oscillation element 24 at a light emission timing. The control unit 5 outputs a control signal to the motor portion 35 so as to control scanning and reflection of the mirror portion 30 in synchronization with the light emission timing of the projected beam PB. The control unit 5 generates observation data of the targets in the detection area DA by processing electric pulses output as detection signals from the decoder 49 of the light receiver 45 in accordance with the light emission timing of the light emitter 22 and the scanning and reflection by the mirror portion 30.

The auxiliary units 6 shown in FIGS. 4 to 6 are arranged on a plurality of positions in at least one of the surroundings of the optical unit 2 and the surroundings of the scanning unit 3 in the accommodation chamber 11. The auxiliary unit 6 includes a necessary component among, e.g., cables and connectors for electrically connecting the electrical components 5, 22, 35, and 45 to the outside or to each other, a holder for holding the cables in the casing portion 12, and a heat sink which dissipates heat from the electrical components 5, 22, 35 and 45.

Figure 11:
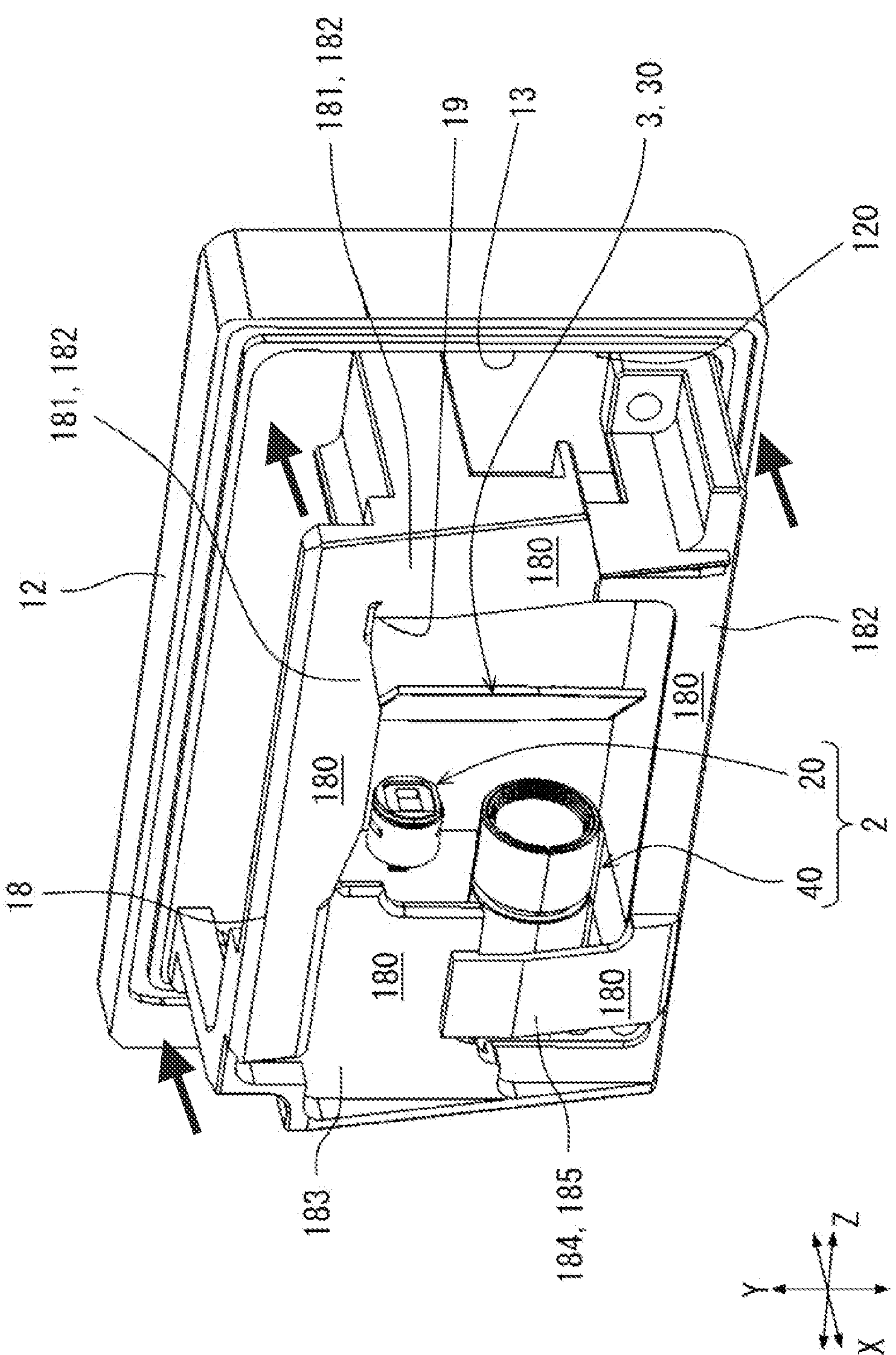
FIG. 11 is a perspective view for explaining a forming method of an accommodation unit according to the first embodiment.

Next, a detailed configuration of the optical sensing device 10 is explained. The accommodation unit 1 of the optical sensing device 10 is configured to include an optical partition member 18 shown in FIGS. 1 to 6 and 9 to 11 in addition to the above-mentioned members 12, 14, and 16. The optical partition member 18 is mainly made of a base material such as metal or synthetic resin and is formed in the shape of a stepped plate frame having an optical aperture 19 as a whole. The outer peripheral side edge portion of the optical partition member 18 is formed to be slightly larger than the outer circumferential edge of the optical window portion 16. As shown in FIG. 11, the outer peripheral side edge of the optical partition member 18 is held to the fixing portion 120 in the casing portion 12 by being assembled and fixed with screwing from a side of the casing opening 13 in the X-axis direction. The outer peripheral side edge of the optical partition member 18 may be supported by the holding portion 14 by being assembled and fixed to the holding portion 14 from a side of the casing opening 13 in the X-axis direction.

The optical partition member 18 is positioned within the accommodation chamber 11 by being held to the holding portion 14 by using a fitting method from the outer peripheral side thereof as shown in FIGS. 4 to 6, with respect to the holding portion 14 assembled and fixed to the casing portion 12 from a side of the casing opening 13. In this positioning state, the optical partition member 18 is arranged to surround the footprints PF and RF of the projected beam PB and the reflected beam RB by the optical aperture 19 from a side of an outer periphery over a whole periphery. In particular, the optical partition member 18 surrounds the overlapping area SA, where the footprints PF and RF of the projected beam PB and the reflected beam RB overlap, by the optical aperture 19 from a side of an outer periphery over a whole periphery.

With this surrounding configuration, the optical partition member 18 is arranged to partition between respective portions 20 and 40 of the optical unit 2 and the optical window portion 16 in the X-axis direction within the accommodation chamber 11, except for the inner side location of the optical aperture 19. Furthermore, in the X-axis direction inside the accommodation chamber 11, the optical partition member 18 partitions between the auxiliary unit 6, which is on a position including a arrangement position on a side of the optical window portion 16 and a side of the opposite thereof with respect to the optical unit 2, and the optical window portion 16 except for an inside position of the optical aperture 19.

As shown in FIGS. 4 to 6 and 9 to 11, the optical partition member 18 forms a low-reflection light-shielding surface 180 by at least the plate surface on a side of the optical window portion 16. As optical characteristics for light in the near-infrared region, a light-shielding property is provided for the low-reflection light-shielding surface 180 by being set with a reflectance rate lower than the above-mentioned light-shielding surface of the holding portion 14 and an absorptance rate higher than the light-shielding surface. That is, the low-reflection light-shielding surface 180 has a lower reflectance rate for the projected beam PB and the reflected beam RB and a higher absorptance rate for the projected beam PB and the reflected beam RB than the light-shielding surface of the holding portion 14. Here, the reflectance rate on the low-reflection light-shielding surface 180 may be defined as a regular reflectance rate or as a total light reflectance rate. Note that the transmittance rate of the low-reflection light-shielding surface 180 is set to, e.g., the same level as the transmittance rate of the light-shielding surface, or less than or equal to the transmittance rate of the light-shielding surface of the holding portion 14.

Figure 12:
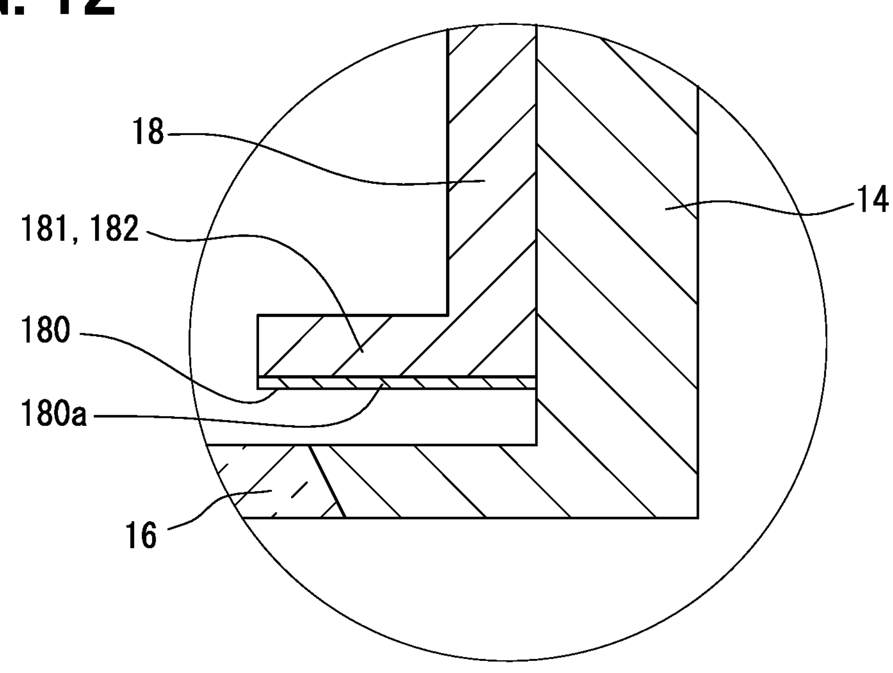
FIG. 12 is an enlarged view of an example of a configuration of the accommodation unit according to the first embodiment, corresponding to FIG. 6.
Figure 12:
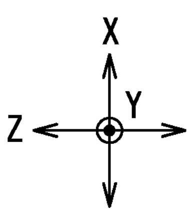

The optical characteristics of the low-reflection light-shielding surface 180 are preferably set by at least one of anodizing treatments such as anodized aluminum treatment, roughening treatments such as blasting, spray painting, plating, and the like. In the configuration example shown in FIG. 12, the low-reflection light-shielding surface 180, of which optical characteristics are set to have a reflectance rate lower than and an absorptance rate higher than the light-shielding surface (in particular, the entire surface including the interior and exterior surfaces and the inner surface of the opening in the drawing) including at least the interior surface on a side of the accommodation chamber 11 in the holding portion 14, is formed by the surface of the low-reflection coating 180*a* made of metal, synthetic resin, or the like which constitutes the plate surface on a side of the optical window portion 16 on the optical partition member 18. Furthermore, in the configuration example of FIG. 12, the surface of the low-reflection treatment film 180*a* forming the low-reflection light-shielding surface 180 looks like a dark color, such as black, in appearance. As described above, the low-reflection light-shielding surface 180 formed on at least the plate surface on a side of the optical window portion 16 on the optical partition member 18 may be, of course, formed on both the plate surfaces on a side of the optical window portion 16 and on an opposite side thereof on the optical partition member 18.

As shown in FIGS. 4 to 6 and 9 to 11, the optical partition member 18 has separation structures 182, in which the low-reflection light-shielding surface 180 is separated from the optical window portion 16 toward a side of the optical unit 2 in the X-axis direction, on both of two locations sandwiching the optical aperture 19 in the Y-axis direction and at one location among two locations sandwiching the optical aperture 19 in the Z-axis direction, respectively. In particular, one separation structure 182 at one of two locations sandwiching the optical aperture 19 in the Y-axis direction and one separation structure 182 at one of two locations sandwiching the optical aperture 19 in the Z-axis direction constitute a parallel surface structure 181 by the low-reflection light-shielding surfaces 180 thereon, respectively.

Each parallel plane structure 181 is inclined with respect to the Y-axis direction, which is the direction of the rotation axis 31 in the mirror portion 30. In particular, the more each parallel surface structure 181 is inclined toward a side of the optical window portion 16 in the X-axis direction, the more it approaches from a lower side on a side of the light receiving portion 40 in the Y-axis direction toward an upper side on a side of the light projecting portion 20 in the Y-axis direction. Here, the optical window portion 16 has an inclined surface structure 160 which is inclined toward a side of the detection area DA in the X-axis direction as it approaches from a lower side to an upper side in the Y-axis direction on an interior surface on a side of the accommodation chamber 11 described above. Therefore, each parallel surface structure 181 on a side of the optical window portion 16 in the optical partition member 18 is therefore arranged in parallel as shown in FIGS. 4 to 6, so that it is directly opposite to the inclined surface structure 160 on a side of the accommodation chamber 11 in the optical window portion 16.

As shown in FIGS. 5, 6, 9 to 11, the optical partition member 18 includes a separation structure 183, in which the low-reflection light-shielding surface 180 is separated from the optical window portion 16 toward a side of the light projecting portion 20 of the optical unit 2 in the X-axis direction, on a side of the optical window portion 16 further away from the light projecting portion 20 in the X-axis direction. The optical partition member 18 includes a separation structure 184, in which the low-reflection light-shielding surface 180 is separated from the optical window portion 16 toward a side of the light receiving portion 40 of the optical unit 2 in the X-axis direction, on a side of the optical window portion 16 further away from the light receiving portion 40 in the X-axis direction.

The separation structure 184 placed between the light receiving portion 40 and the optical window portion 16 also constitutes a deflection structure 185 which is deflected in an arched shape toward a side of the optical window portion 16 in the X-axis direction more than the separation structure 183 placed between the light projecting portion 20 and the optical window portion 16. In particular, as shown in FIGS. 5 and 6, the deflection structure 185 is close to the optical window portion 16 as much as possible than the respective parallel surface structures 181 which are the separation structures 182. This enables to form the low-reflection light-shielding surface 180 of the separation structure 184 within a range which allows the light-receiving lens system 42 formed in a large diameter protruding toward a side of the optical window portion 16 more than the light-projecting lens system 26, as described above, and ensures a necessary minimum distance at a separation distance to the optical window portion 16.

Actions and Effects

The actions and effects of the first embodiment described above are described below.

According to the first embodiment, the footprints PF and RF of the optical paths of the projected light beam PB projected from the light projecting portion 20 and the reflected light beam RB received by the light receiving portion 40 overlap. According to this, in the optical unit 2 accommodated in the accommodation chamber 11 formed by the accommodation unit 1, the light projecting portion 20 and the light receiving portion 40 may be arranged as close as possible in the Y-axis direction in which the footprints PF and RF overlap. Therefore, it is possible to reduce the size of the accommodation unit 1 and downsize the optical sensing device 10 as a whole.

Furthermore, according to one aspect, the optical window portion 16, which transmits the projected beam PB from the accommodation chamber 11 to the detection area DA and transmits the reflected beam RB from the detection area DA to the accommodation chamber 11 in the accommodation unit 1, is surrounded by the holding portion 14 and held from a side of the outer periphery. Therefore, in the accommodation unit 1, the optical partition member 18, in which a reflectance rate to the projected beam PB is lower than that of the holding portion 14 on a side of the optical window portion 16 and an absorptance rate to the projected beam PB is higher than that of the holding portion 14 on a side of the optical window portion 16, is arranged to partition between optical unit 2 and the optical window portion 16.

According to the arrangement of the partition member in the first embodiment, the noise light generated when the projected beam PB is reflected by the optical window portion 16 is blocked by the optical partition member 18, it is possible to restrict a direct intrusion to the optical unit 2. In addition, it is possible to restrict indirect intrusion of the noise light to the optical unit 2 through reflection or scattering by the auxiliary unit 6 surrounding the optical unit 2 in the accommodation chamber 11 by being blocked by the optical partition member 18.

For these reasons, in the first embodiment, it is possible to ensure detection accuracy by achieving both of downsizing and suppressing erroneous detection caused by the intrusion of noise light. In particular, in the first embodiment, since the noise in the detection signal from the light receiving portion 40 is reduced due to the restriction of the intrusion of noise light, and the S/N ratio is increased, it is also possible to ensure detection accuracy especially for short distance positions in the detection area DA.

The optical partition member 18 of the first embodiment is arranged to surround the footprints PF and RF of the projected beam PB and reflected beam RB from a side of the outer periphery. According to this, it is possible to reduce the intrusion rate of noise light by forming the inner peripheral side edge portion of the optical partition member 18 as close as possible to the footprints PF and RF of the projected beam PB and reflected beam RB. Therefore, it is possible to improve the effect of suppressing erroneous detection caused by the intrusion of noise light and realize highly accurate detection.

The separation structures 182, 183, and 184 in the optical partition member 18 of the first embodiment are spaced apart from the optical window portion 16 toward a side of the optical unit 2. According to this, even if the noise light becomes stray light because it is also reflected by the optical partition member 18, it is possible to restrict intrusion into the optical unit 2 by keeping a portion of the reflection on the optical partition member 18 as more separated as possible from the footprint PF, and RF of the projected beam PB and the reflected beam RB. Therefore, it is possible to improve the effect of suppressing erroneous detection caused by the intrusion of noise light and realize highly accurate detection.

The light-receiving lens system 42 guiding the reflected beam RB in the light receiving portion 40 of the first embodiment is formed with a large diameter protruding toward a side of the optical window portion 16 more than the light-projecting lens system 26 guiding the projected beam PB in the light projecting portion 20. Therefore, the optical partition member 18 of the first embodiment includes the deflection structure 185 which is deflected to a side of the optical window portion 16 at a location next to the light-receiving lens system 42 more than a location next to the light-projecting lens system 26. According to this, the intrusion of noise light may be restricted by the deflection structure 185 of the optical partition member 18 to the light-receiving lens system 42 with a wide angle which can increase a light collection efficiency by increasing a diameter. Therefore, it is possible to improve the effect of suppressing erroneous detection caused by the intrusion of noise light and realize highly accurate detection.

In the first embodiment, the scanning unit 3 accommodated in the accommodation chamber 11 scans the projected beam PB from the light projecting portion 20 toward the detection area DA and reflect the reflected beam RB from the detection area DA to the light receiving portion 40. According to this, it is possible to restrict indirect intrusion of the noise light to the scanning unit 3 through reflection or scattering by the auxiliary unit 6 surrounding the optical unit 2 in the accommodation chamber 11 in which the noise light is blocked by the optical partition member 18. Therefore, it is possible to improve the effect of suppressing erroneous detection caused by the intrusion of noise light and realize highly accurate detection.

In the optical window portion 16 of the first embodiment, the inclined surface structure 160 on a side of the accommodation chamber 11 is inclined with respect to the Y-axis direction, which is the rotation axis direction of the mirror portion 30 which is driven in a rotational manner in the scanning unit 3. According to this, it is possible to reduce the possibility that the projected beam PB reflected by the inclined surface structure 160 on a side of the accommodation chamber 11 becomes noise light that enters the optical unit 2 and the scanning unit 3. Therefore, it is possible to improve the effect of suppressing erroneous detection caused by the intrusion of noise light and realize highly accurate detection.

In the optical partition member 18 of the first embodiment, the parallel surface structure 181 is arranged in parallel along the inclined surface structure 160. According to this, it is possible to suppress enlarging the size of the accommodation unit 1 as much as possible in the X-axis direction in which the parallel surface structure 181 of the optical partition member 18 and the inclined surface structure 160 of the optical window portion 16 are parallel to each other. Therefore, it is possible to promote downsizing of the optical sensing device 10 as a whole.

In the accommodation unit 1 of the first embodiment, the optical partition member 18 is assembled and fixed from a side of the casing opening 13 to the casing portion 12 which defines the accommodation chamber 11 by covering the casing opening 13 with the optical window portion 16 and the holding portion 14. According to this, even if the accommodation unit 1 is downsized, the optical partition member 18 can be easily and accurately positioned by assembling and fixing in one specific direction, that is, in the X-axis direction. Therefore, it is possible to appropriately construct a noise light intrusion limiting structure to achieve an effect of suppressing false detection and, furthermore, ensuring detection accuracy as expected.

Second Embodiment

Figure 13:
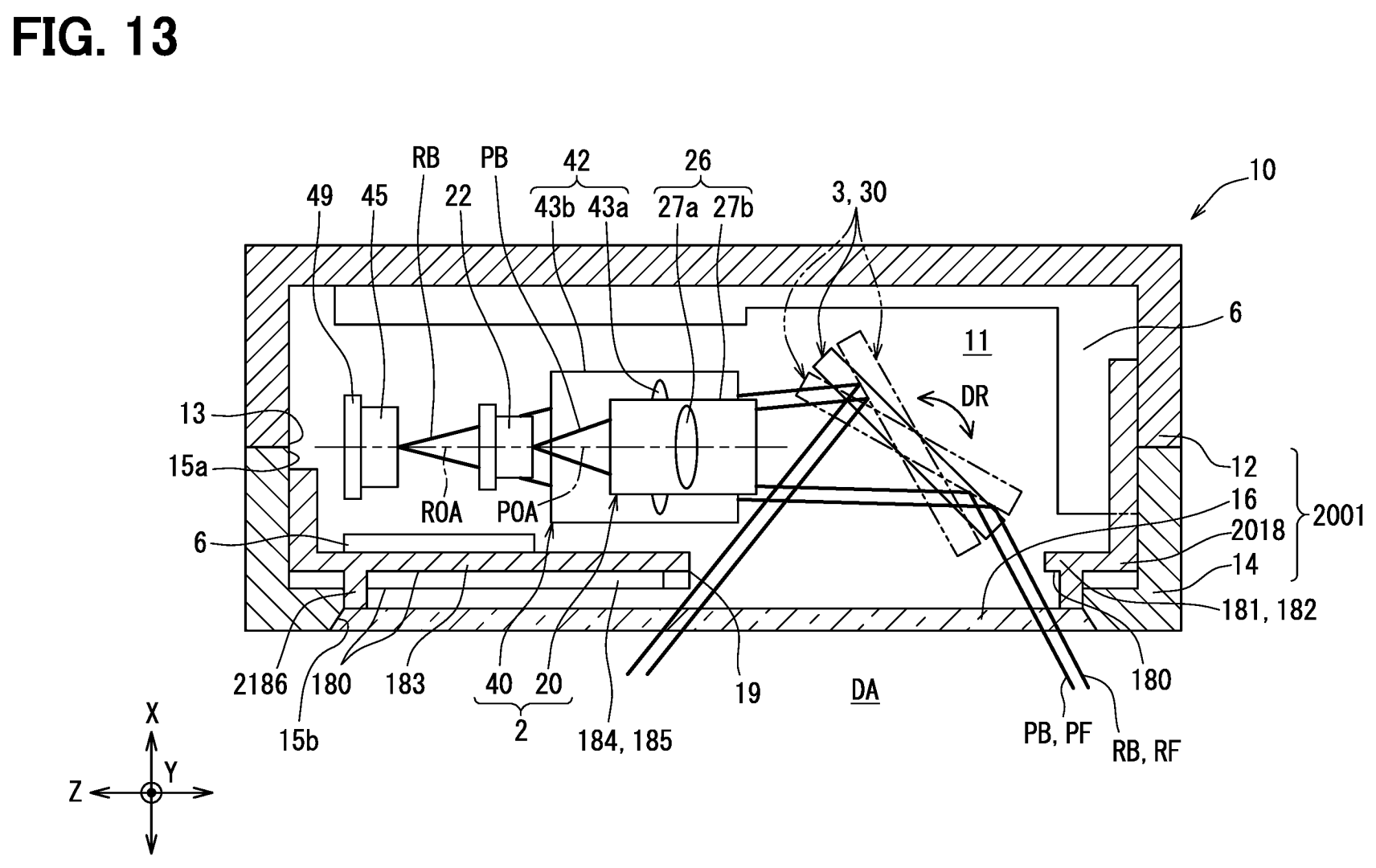

A second embodiment is a modification to the first embodiment. In the accommodation unit 2001 of the second embodiment shown in FIG. 13, the inner peripheral side edge portion 2186 defining the optical aperture 19 of the optical partition member 2018 comes in contact with both the outer peripheral side edge portion of the optical window portion 16 and the inner peripheral side edge portion of the holing portion 14. In particular, in the optical partition member 2018, the distal end surface and the outer peripheral surface of the inner peripheral side edge portion 2186, which protrudes toward a side of the optical window portion 16 side in a cylindrical wall shape, come in contact with the interior surface of the optical window portion 16 and the inner peripheral surface of the holding portion 14, respectively. Here, the inner peripheral side edge portion 2186 of the optical partition member 2018 may be adhesively fixed to at least one of contact points with the optical window portion 16 and the holding portion 14. Furthermore, the inner peripheral surface of the inner peripheral side edge portion 2186 of the optical partition member 2018 has the optical characteristics of the low-reflection light-shielding surface 180 as a part of the low-reflection light-shielding surface 180 in the second embodiment.

In this way, the optical partition member 2018 of the second embodiment comes in contact with both the outer peripheral side edge portion of the optical window portion 16 and the inner peripheral side edge portion of the holding portion 14. According to this, it is possible to restrict intrusion to the optical unit 2 even for the noise light generated when the projected beam PB is reflected on the outer peripheral side edge portion of the optical window portion 16 held by the inner peripheral side edge portion of the holding portion 14 can enter the optical unit 2. Therefore, it is possible to improve the effect of suppressing erroneous detection caused by the intrusion of noise light and realize highly accurate detection.

Third Embodiment

Figure 14:
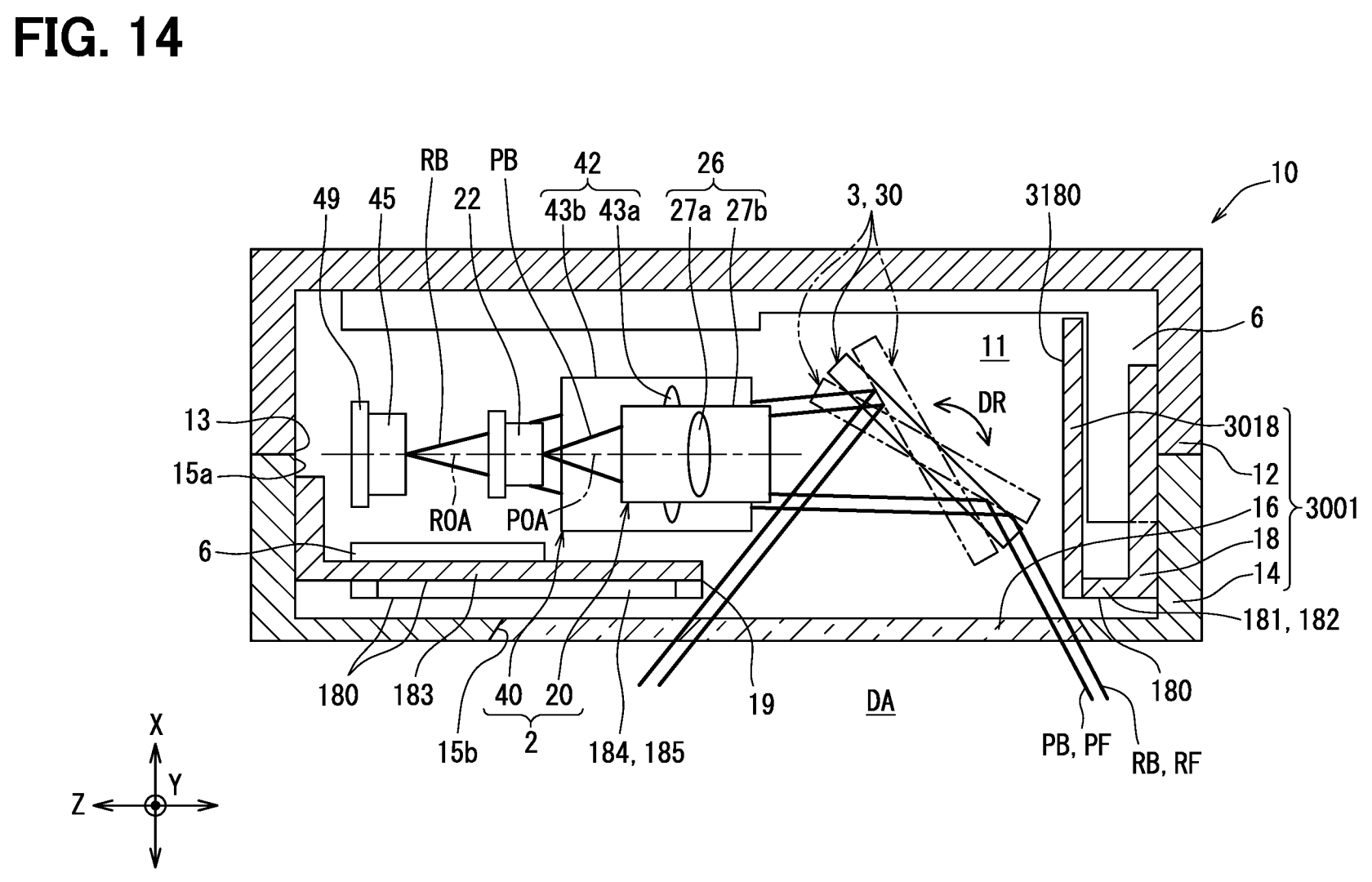

A third embodiment is a modification to the first embodiment. The accommodation unit 3001 of the third embodiment shown in FIG. 14 includes an additional scanning-side optical partition member 3018 and the window-side optical partition member 18 as the optical partition member 18 arranged to partition between the optical unit 2 and the optical window portion 16.

The scanning-side optical partition member 3018 is mainly formed of a base material such as metal or synthetic resin and is formed into a flat plate shape as a whole. The scanning-side optical partition member 3018 is either integrally formed or separately formed with the window-side optical partition member 18. In a configuration of either one of integrally formed or separately formed, the scanning-side optical partition member 3018 is held directly or indirectly by the casing portion 12.

The scanning-side optical partition member 3018 is arranged on a side of the scanning unit 3 opposite to the respective portions 20 and 40 configuring the optical unit 2 in the Z-axis direction. In this way, the Z-axis direction in which the scanning-side optical partition member 3018 and the portions 20 and 40 of the optical unit 2 sandwich the scanning unit 3 is designed to place it on a direction perpendicular to the Y-axis direction, which is the rotation axis direction of the mirror portion 30 in the scanning unit 3. Furthermore, in the Z-axis direction inside the accommodation chamber 11, the scanning-side optical partition member 3018 partitions between the auxiliary unit 6 located on a side of the scanning unit 3 opposite to the optical unit 2 and the scanning unit 3.

The scanning-side optical partition member 3018 forms a low-reflection light-shielding surface 3180 by at least the plate surface on the scanning unit 3 side. A low-reflection type light-shielding property is provided for the low-reflection light-shielding surface 3180 by setting a reflectance rate lower than the above-mentioned light-shielding surface of the holding portion 14 and an absorptance rate higher than the light-shielding surface as optical characteristics for light in the near-infrared region. That is, the low-reflection light-shielding surface 3180 demonstrates a lower reflectance rate for the projected beam PB and the reflected beam RB and a higher absorptance rate for the projected beam PB and the reflected beam RB in comparison with the light-shielding surface of the holding portion 14. The optical characteristics of the low-reflection light-shielding surface 3180 may be preferably set by the same process as the low-reflection light-shielding surface 180 of the window-side optical partition member 18. Note that the definition of reflectance rate and setting of transmittance rate regarding the low-reflection light-shielding surface 3180 are the same as those for the low-reflection light-shielding surface 180.

In this way, the accommodation unit 3001 of the third embodiment is configured to include the scanning-side optical partition member 3018 disposed on a side of the scanning unit 3 opposite to the optical unit 2 in addition to the window-side optical partition member 18 disposed between the optical unit 2 and the optical window portion 16. Here, in the scanning-side optical partition member 3018, the reflectance rate to the projected beam PB and the reflected beam RB is lower than that of the holding portion 14 on a side of the scanning unit 3 and the absorptance rate to the beams PB and RB is higher than that of the holding portion 14 on a side of the scanning unit 3.

According to the configuration of the third embodiment, the projected beam PB and the reflected beam RB are reflected by the scanning unit 3, so that even if noise light leaks out of the optical path of the beams PB and RB, it is possible to block by the scanning-side optical partition member 3018. As a result, it is possible to restrict indirect intrusion of the noise light, which leaks out of the optical path from the scanning unit 3, to the optical unit 2 through reflection or scattering by the auxiliary unit 6 surrounding the scanning unit 3 in the accommodation chamber 11. Therefore, it is possible to improve the effect of suppressing erroneous detection caused by the intrusion of noise light and realize highly accurate detection.

In the third embodiment, the scanning unit 3 is placed between the optical unit 2 and the scanning-side optical partition member 3018 in the Z-axis direction that is orthogonal to the Y-axis direction, which is the rotation axis direction of the mirror portion 30 which is driven in a rotational manner. According to this, the noise light leaking out of the optical path from the scanning unit 3 can be effectively blocked by the scanning-side optical partition member 3018, it is possible to restrict the noise light from indirectly entering the optical unit 2. Therefore, it is possible to improve the effect of suppressing erroneous detection caused by the intrusion of noise light and realize highly accurate detection.

Fourth Embodiment

Figure 15:
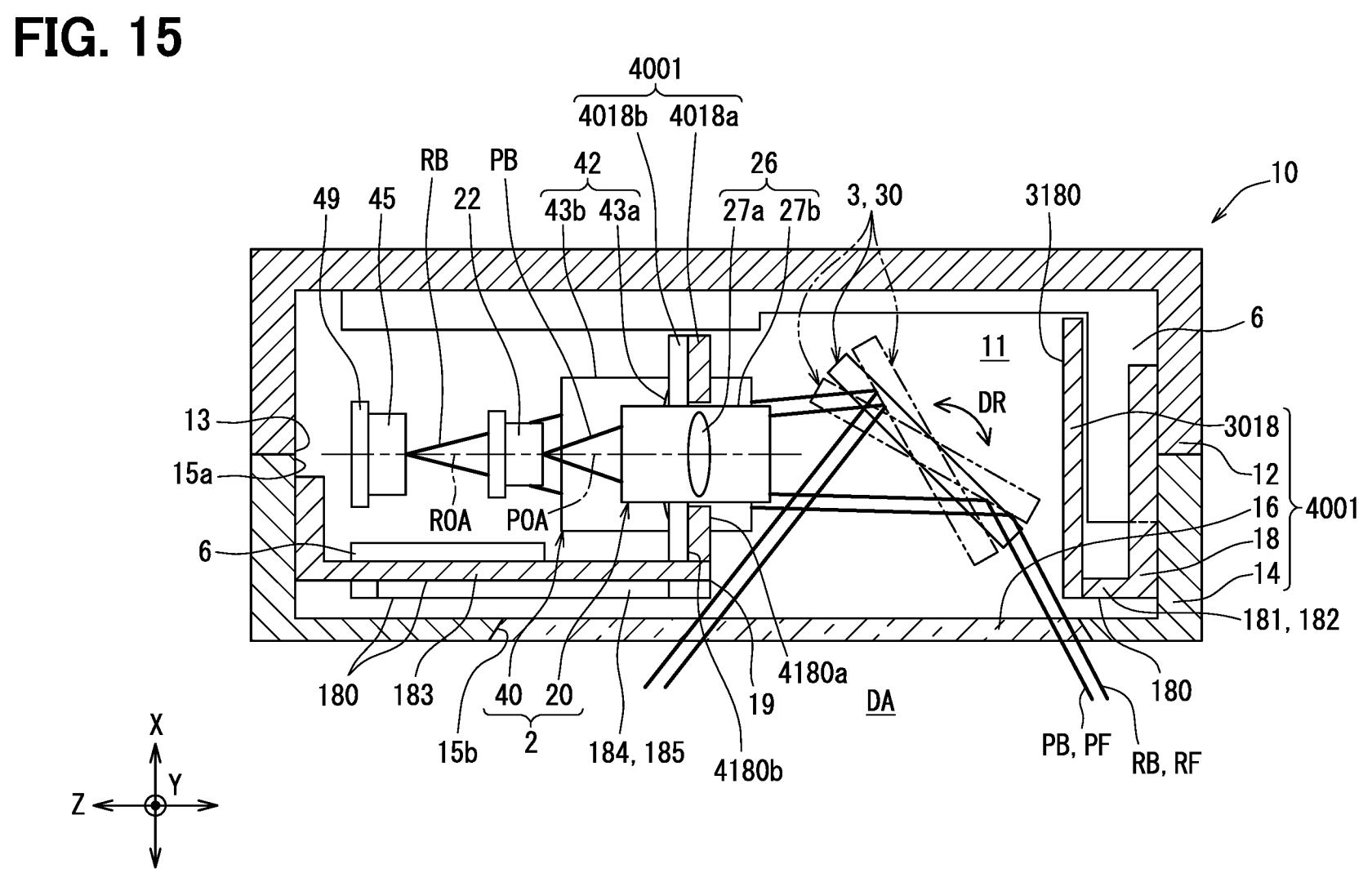

A fourth embodiment is a modification of the third embodiment. In the accommodation unit 4001 of the fourth embodiment shown in FIG. 15, the projecting-side optical partition member **4018*a* and the receiving-side optical partition member 4018*b* are additionally provided on a side of the scanning unit 3 opposite to the scanning-side optical partition member 3018** in the Z-axis direction.

The projecting-side optical partition member **4018*a* is mainly formed of a base material such as metal or synthetic resin and is formed into an annular flat plate shape as a whole. The projecting-side optical partition member 4018*a* is either integrally formed or separately formed with the window-side optical partition member 18. In a configuration of either one of integrally formed or separately formed, the projecting-side optical partition member 4018*a* is held directly or indirectly by the casing portion 12. The projecting-side optical partition member 4018*a* is arranged so as to surround the light-projecting lens system 26 of the light projecting portion 20** from an outer peripheral side over a whole periphery.

The projecting-side optical partition member 4018*a* forms a low-reflection light-shielding surface 4180*a* by at least the plate surface on a side of the scanning unit 3. A low-reflection type light-shielding property is provided for the low-reflection light-shielding surface 4180*a* by setting a reflectance rate lower than the above-mentioned light-shielding surface of the holding portion 14 and an absorptance rate higher than the light-shielding surface as optical characteristics for light in the near-infrared region. That is, the low-reflection light-shielding surface 4180*a* demonstrates a lower reflectance rate for the projected beam PB and the reflected beam RB and a higher absorptance rate for the projected beam PB and the reflected beam RB in comparison with the light-shielding surface of the holding portion 14. The optical characteristics of the low-reflection light-shielding surface 4180*a* may be preferably set by the same process as the low-reflection light-shielding surface 180 of the window-side optical partition member 18. Note that the definition of reflectance rate and setting of transmittance rate regarding the low-reflection light-shielding surface 4180*a* are the same as those for the low-reflection light-shielding surface 180.

The receiving-side optical partition member 4018*b* is mainly formed of a base material such as metal or synthetic resin and is formed into an annular flat plate shape as a whole. The receiving-side optical partition member 4018*b* is configured by a combination of either integrally or separately formed with the window-side optical partition member 18, and integrally or separately formed with the projecting-side optical partition member 4018*a*. In either combination of integral formation and separate formation, the receiving-side optical partition member 4018*b* is held directly or indirectly by the casing portion 12. The receiving-side optical partition member 4018*b* is arranged so as to surround the light-receiving lens system 42 of the light receiving portion 40 from an outer peripheral side over a whole periphery.

The receiving-side optical partition member 4018*b* forms a low-reflection light-shielding surface 4180*b* by at least the plate surface on a side of the scanning unit 3. A low-reflection type light-shielding property is provided for the low-reflection light-shielding surface 4180*b* by setting a reflectance rate lower than the above-mentioned light-shielding surface of the holding portion 14 and an absorptance rate higher than the light-shielding surface as optical characteristics for light in the near-infrared region. That is, the low-reflection light-shielding surface 4180*b* demonstrates a lower reflectance rate for the projected beam PB and the reflected beam RB and a higher absorptance rate for the projected beam PB and the reflected beam RB in comparison with the light-shielding surface of the holding portion 14. The optical characteristics of the low-reflection light-shielding surface 4180*b* may be preferably set by the same process as the low-reflection light-shielding surface 180 of the window-side optical partition member 18. Note that the definition of reflectance rate and setting of transmittance rate regarding the low-reflection light-shielding surface 4180*b* are the same as those for the low-reflection light-shielding surface 180.

In this way, the accommodation unit 4001 of the fourth embodiment is configured to include the projecting-side optical partition member 4018*a*, which is arranged to surround the light projecting portion 20 from a side of the outer periphery in addition to the window-side optical partition member 18 disposed between the optical unit 2 and the optical window portion 16, and the scanning-side optical partition member 3018 disposed on a side of the scanning unit 3 opposite to the optical unit 2. Here, in the projecting-side optical partition member 4018*a*, the reflectance rate to the projected beam PB and the reflected beam RB is lower than that of the holding portion 14 on a side of the scanning unit 3 and the absorptance rate to the beams PB and RB is higher than that of the holding portion 14 on a side of the scanning unit 3.

Furthermore, the accommodation unit 4001 of the fourth embodiment is configured to further include a receiving-side optical partition member 4018*b*, which is arranged to surround the light receiving portion 40 from the outer peripheral side, in addition to the above-described window-side optical partition member 18, scanning-side optical partition member 3018, and projecting-side optical partition member 4018*a*. Here, in the receiving-side optical partition member 4018*b*, the reflectance rate to the projected beam PB and the reflected beam RB is lower than that of the holding portion 14 on a side of the scanning unit 3 and the absorptance rate to the beams PB and RB is higher than that of the holding portion 14 on a side of the scanning unit 3.

According to the configuration of the fourth embodiment, the projected beam PB and the reflected beam RB are reflected by the scanning unit 3, so that even if noise light leaks out of the optical path of the beams PB and RB, it is possible to be blocked by each of the light projecting-side optical partition member 4018*a* and the light receiving-side optical partition member 4018*b*. As a result, the noise light leaking out of the optical path from the scanning unit 3, including indirect intrusion to the light projecting portion 20 and the light receiving portion 40 through reflection or scattering by the auxiliary unit 6 around the scanning unit 3 in the accommodation chamber 11, may be restricted. Therefore, it is possible to improve the effect of suppressing erroneous detection caused by the intrusion of noise light and realize highly accurate detection.

Fifth Embodiment

A fifth embodiment is a modification of the fourth embodiment. In the fifth embodiment accommodation unit 5001 shown in FIG. 16, the scanning-side optical partition member 5018 is added over between each of the light projecting side optical partition member 4018*a* and the light receiving side optical partition member 4018*b* and the scanning side optical partition member 3018.

The receiving-side optical partition member 5018 is mainly formed of a base material such as metal or synthetic resin and is formed into an annular flat plate shape as a whole. The scanning-side optical partition member 5018 is configured by a combination of, either one among integrally formed or separately formed with the scanning-side optical partition member 3018, either one among integrally formed or separately formed with the projecting-side optical partition member 4018*a*, and either one among integrally formed or separately formed with the projecting-side optical partition member 4018*b*. In a combination configuration of either one of integrally formed or separately formed, the scanning-side optical partition member 5018 is held directly or indirectly by the casing portion 12.

The scanning-side optical partition member 5018 is arranged on a side of the scanning unit 3 opposite to the optical window portion 16 in the X-axis direction. In this way, the X-axis direction in which the scanning-side optical partition member 5018 and the optical window portion 16 sandwich the scanning unit 3 is designed to place it on a direction perpendicular to the Y-axis direction, which is the rotation axis direction of the mirror portion 30 in the scanning unit 3. Furthermore, in the X-axis direction inside the accommodation chamber 11, the scanning-side optical partition member 5018 partitions between the auxiliary unit 6 located on a side of the scanning unit 3 opposite to the optical window portion 16 and the scanning unit 3.

The scanning-side optical partition member 5018 forms a low-reflection light-shielding surface 5180 by a plate surface that faces at least a side of the scanning unit 3 and a side of the optical window portion 16. A low-reflection type light-shielding property is provided for the low-reflection light-shielding surface 5180 by setting a reflectance rate lower than the above-mentioned light-shielding surface of the holding portion 14 and an absorptance rate higher than the light-shielding surface as optical characteristics for light in the near-infrared region. That is, the low-reflection light-shielding surface 5180 demonstrates a lower reflectance rate for the projected beam PB and the reflected beam RB and a higher absorptance rate for the projected beam PB and the reflected beam RB in comparison with the light-shielding surface of the holding portion 14. The optical characteristics of the low-reflection light-shielding surface 5180 may be preferably set by the same process as the low-reflection light-shielding surface 180 of the window-side optical partition member 18. Note that the definition of reflectance rate and setting of transmittance rate regarding the low-reflection light-shielding surface 5180 are the same as those for the low-reflection light-shielding surface 180.

In this way, the accommodation unit 5001 of the fifth embodiment is configured to include a scanning-side optical partition member 5018 disposed on a side of the scanning unit 3 opposite to the optical window portion 16 in addition to the window-side optical partition member 18 disposed between the optical unit 2 and the optical window portion 16, and the optical partition member 3018 disposed on a side of the scanning unit 3 opposite to the optical unit 2. Here, in the scanning-side optical partition member 5018, the reflectance rate to the projected beam PB and the reflected beam RB is lower than that of the holding portion 14 on a side of the scanning unit 3 and the absorptance rate to the beams PB and RB is higher than that of the holding portion 14 on a side of the scanning unit 3.

According to the configuration of the fifth embodiment, the projected beam PB and the reflected beam RB are reflected by the scanning unit 3, so that even if noise light leaks out of the optical path of the beams PB and RB, it is possible to block by the scanning-side optical partition member 5018. As a result, it is possible to restrict indirect intrusion of the noise light, which leaks out of the optical path from the scanning unit 3, to the optical unit 2 through reflection or scattering by the auxiliary unit 6 surrounding the scanning unit 3 in the accommodation chamber 11. Therefore, it is possible to improve the effect of suppressing erroneous detection caused by the intrusion of noise light and realize highly accurate detection.

In the fifth embodiment, the scanning unit 3 is placed between the optical window portion 16 and the scanning-side optical partition member 5018 in the X-axis direction that is orthogonal to the Y-axis direction, which is the rotation axis direction of the mirror portion 30 which is driven in a rotational manner. According to this, the noise light leaking out of the optical path from the scanning unit 3 can be effectively blocked by the scanning-side optical partition member 5018, it is possible to restrict the noise light from indirectly entering the optical unit 2. Therefore, it is possible to improve the effect of suppressing erroneous detection caused by the intrusion of noise light and realize highly accurate detection.

Other Embodiments

Although a plurality of embodiments have been described above, the present disclosure is not to be construed as being limited to these embodiments and can be applied to various embodiments and combinations within a scope not deviating from the gist of the present disclosure. Specifically, in the modified examples of the first to fifth embodiments, the moving object on which the optical sensing device 10 is mounted may be, for example, an autonomous vehicle that can be operated remotely.

In a modified example of the first to fifth embodiments, the laser oscillation elements 24 may be arranged such that a plurality of element rows along the Y-axis direction are aligned in a plurality of rows along the X-axis direction. In a modified example of the first to fifth embodiments, the light receiving pixels 46 may be arranged such that a pixel row along the Y-axis direction are lined up in a plurality of rows in the X-axis direction or an inclined direction thereof.

In a modification of the first to fifth embodiments, the laser oscillation elements 24 may be arranged in a single row along the X-axis direction. In a modified example of the first to fifth embodiments, the light receiving pixels 46 may be arranged in a single row along the X-axis direction or the inclined direction thereof.

In the modified examples of the first to fifth embodiments, the optical partition member 18, 2018, 3018, **4018*a*, 4018*b*, and 5018 may be integrally formed with any one of the optical window portion 16, the holding portion 14, and the casing portion 12. In this case, it is preferable that low-reflection light-shielding surfaces 180, 3180, 4180*a*, 4180*b*, and 5180 may be formed on a structure portion of the optical partition member 18**.

Figure 17:
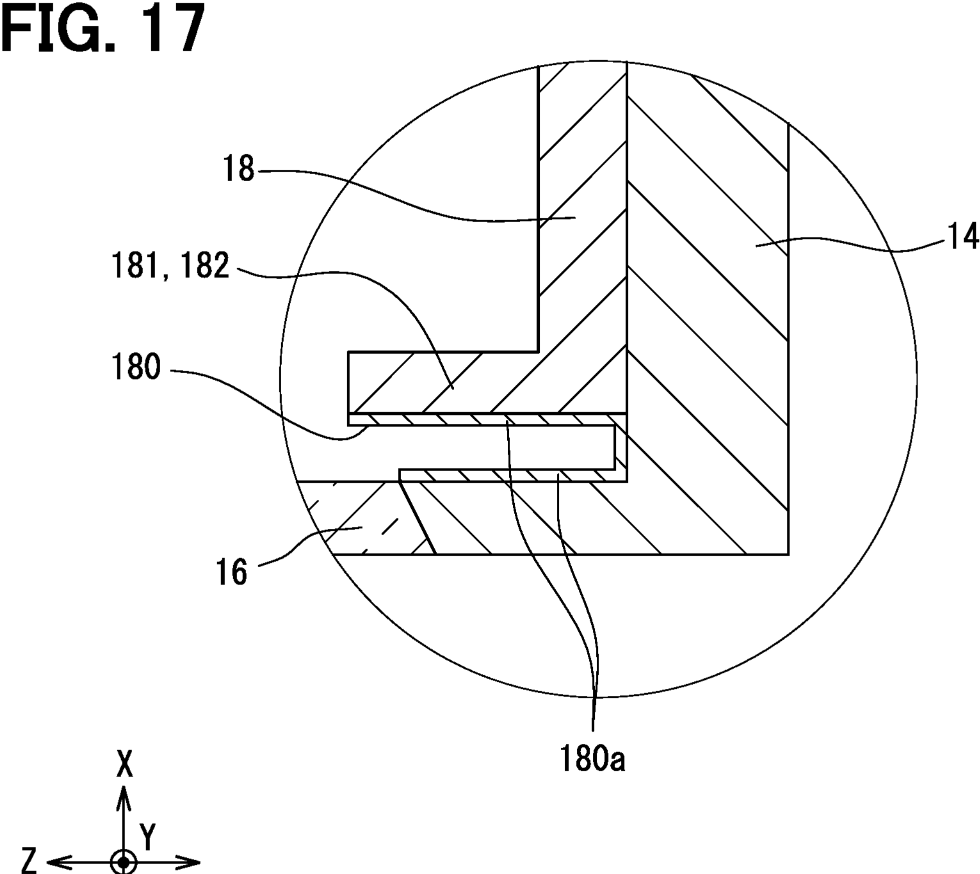
FIG. 17 is a schematic diagram of an example of a configuration of the accommodation unit according to an modified embodiment, corresponding to FIG. 12.

In the modified examples of the first to fifth embodiments, as shown in FIG. 17, a low-reflection light-shielding surface 180 may be formed over a portion from a plate surface on a side of the optical window portion 16 to the interior surface on a side of the accommodation chamber 11 in the holding portion 14 of the optical partition member 18, 2018, 3018, **4018*a*, 4018*b*, and 5018. Here, in the modified example of FIG. 17, which typically shows a modified example of the first embodiment in a representative manner, a surface of the low reflection treated film 180*a* may provide the low-reflection light-shielding surface 180 whose optical characteristics are set with a reflectance rate lower than and an absorptance rate higher than that of the light-shielding surface (particularly the exterior surface and the inner surface of the opening in the drawing) excluding the interior surface on a side of the accommodation chamber 11 of the holding portion 15**.

Figure 18:
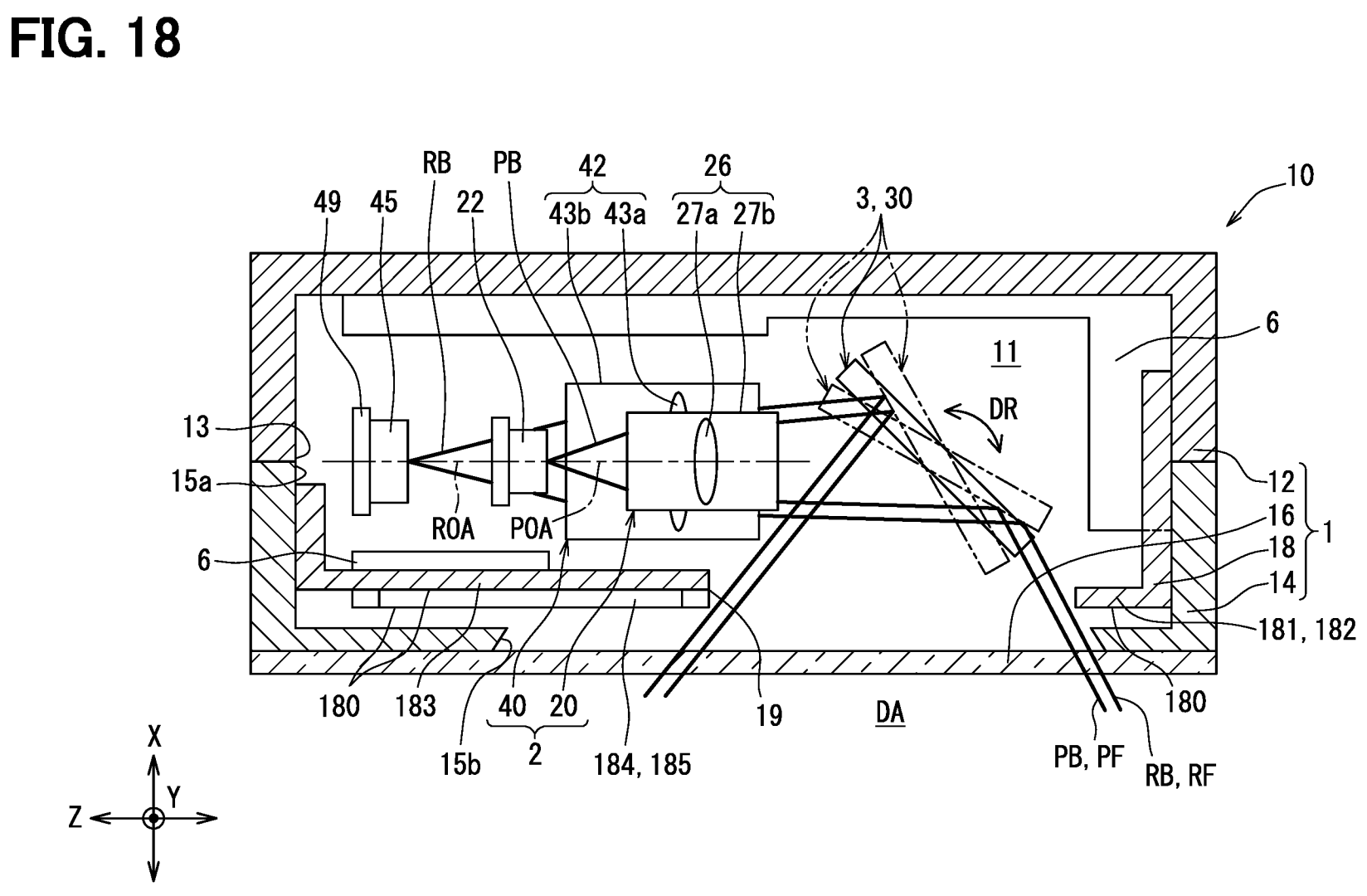
Figure 19:
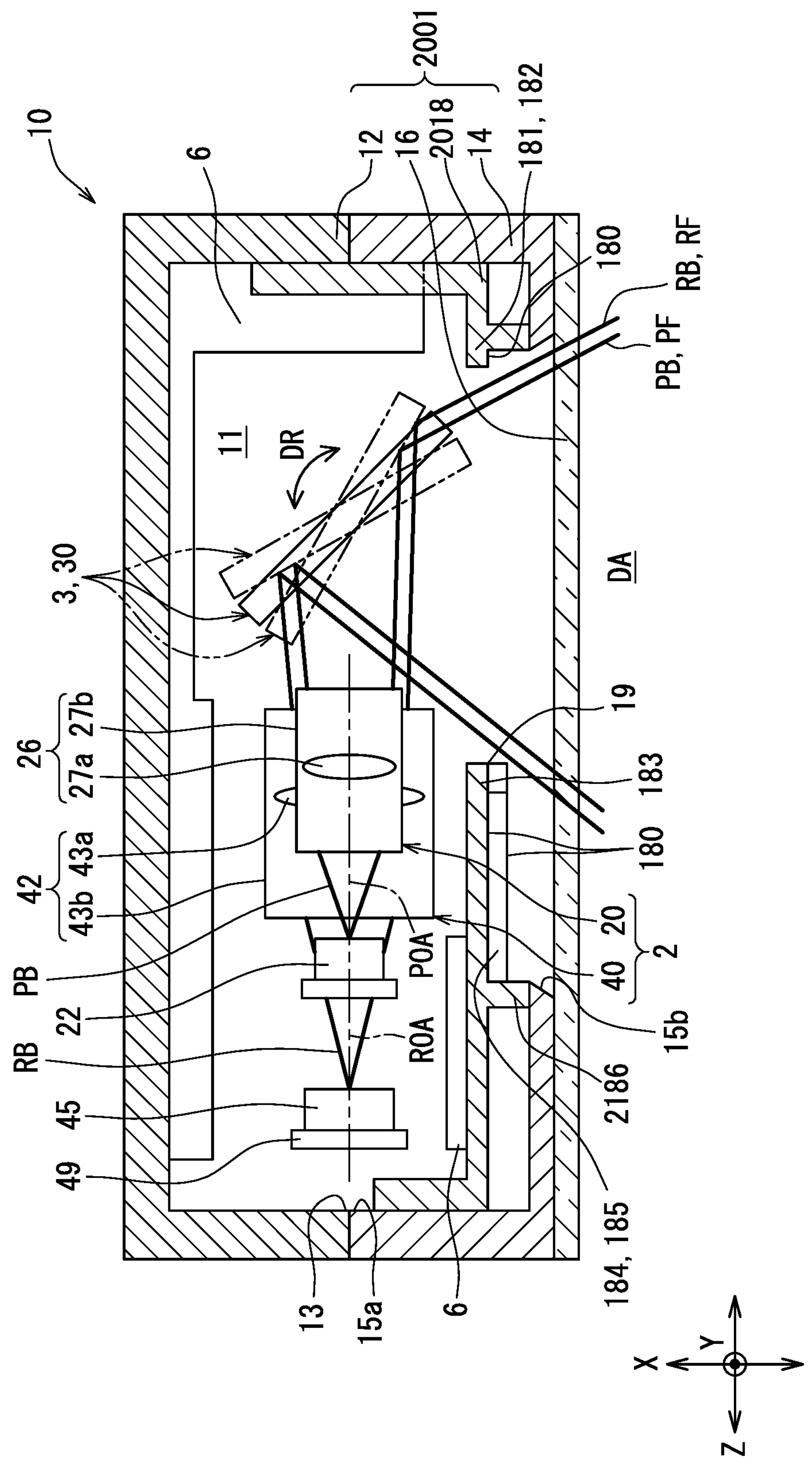
FIG. 19 is a schematic diagram of an optical sensing device according to a modified embodiment, corresponding to FIG. 6.

In a modified example of the first to fifth embodiments, as shown in FIGS. 18 and 19, an interior surface, which is on a side of the accommodation chamber 11 among an outer peripheral side edge portion of the optical window portion 16, may be fixed to an exterior surface, which is on a side of the detection area DA among a plate frame-shaped wall portion including an inner peripheral side edge portion surrounding the optical opening **15*b* of the holding portion 14, in a state coming into contact with each other over a whole periphery, e.g., by adhesive or the like. Here, in FIGS. 18 and 19 representatively showing modifications of the first and second embodiments, the geometric center of the optical aperture 15*b* and the geometric center of the optical window portion 16 are deflected in the Z-axis direction, but, if the interior surface of the optical window portion 16 is fixed to the exterior surface of the holding portion 14, their geometric centers may be substantially aligned. In a modified example of the first to fifth embodiments, an opposite arrangement, in which an exterior surface of the optical window portion 16, which is on a side of the detection area DA among surfaces on the outer peripheral side edge portion, may be fixed to an interior surface of the holding portion 14, which is on a side of the accommodation chamber 11** among surfaces on a plate frame-shaped wall portion including an inner peripheral side edge portion, in a state coming into contact with each other over a whole periphery, e.g., by adhesive or the like.

In a modification of the second embodiment, as shown in FIGS. 19 and 20, the inner peripheral side edge portion 2186 of the optical partition member 2018 may be connected, by a configuration in which no surface contact is made (a configuration including spacing, point contact, and line contact) to one member, similar to the first embodiment, among the inner peripheral side edge portion of the holding portion 14 and the outer peripheral side edge portion of the optical window portion 16, and only to the other one member with a surface contact. In a modification of the third to fifth embodiments, the window-side optical partition member 18 may be provided with an inner peripheral side edge portion 2186 similar to the second embodiment or a modification thereof.

Figure 21:
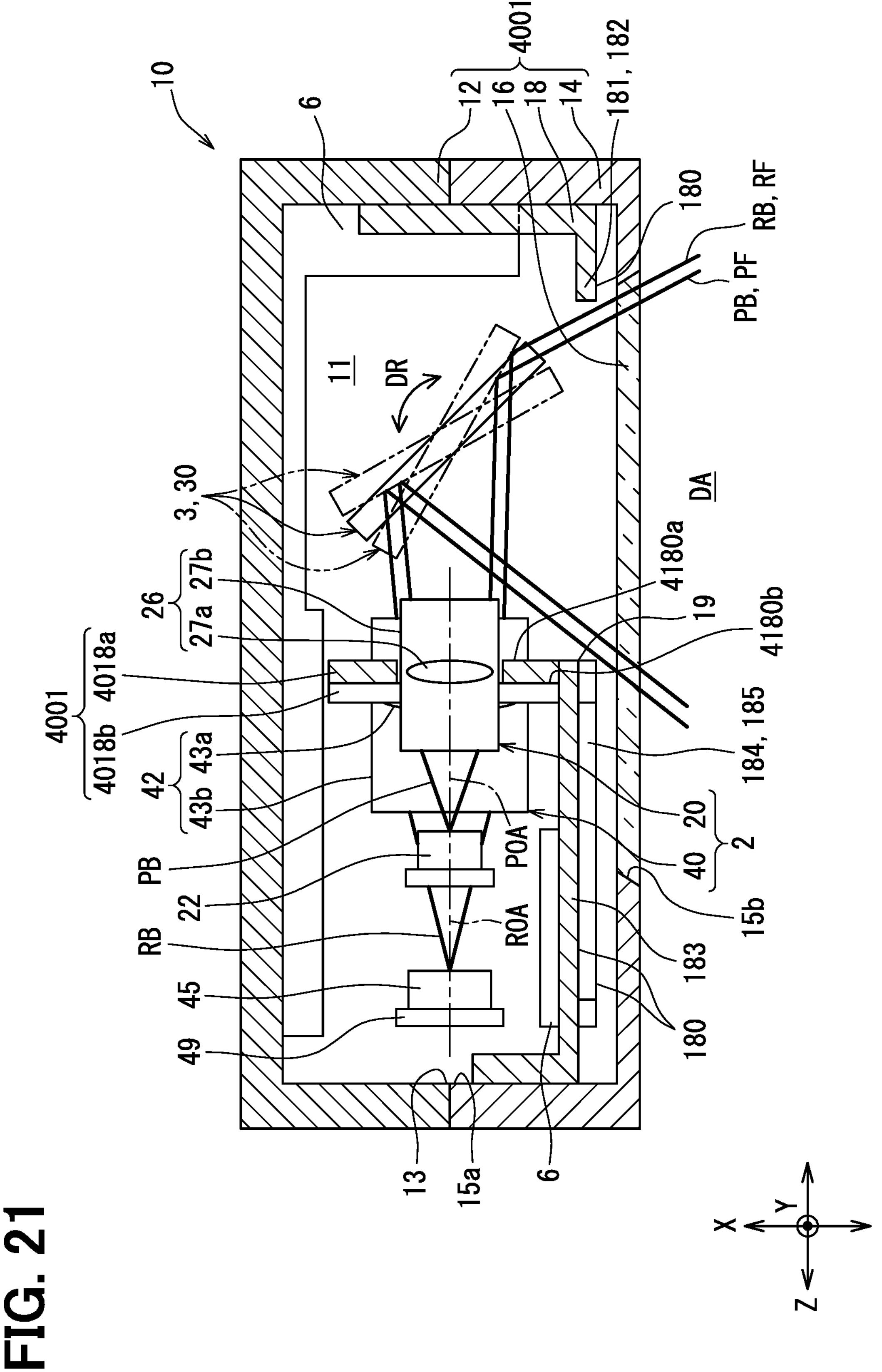
FIG. 21 is a schematic diagram of an optical sensing device according to a modified embodiment, corresponding to FIG. 6.
Figure 22:
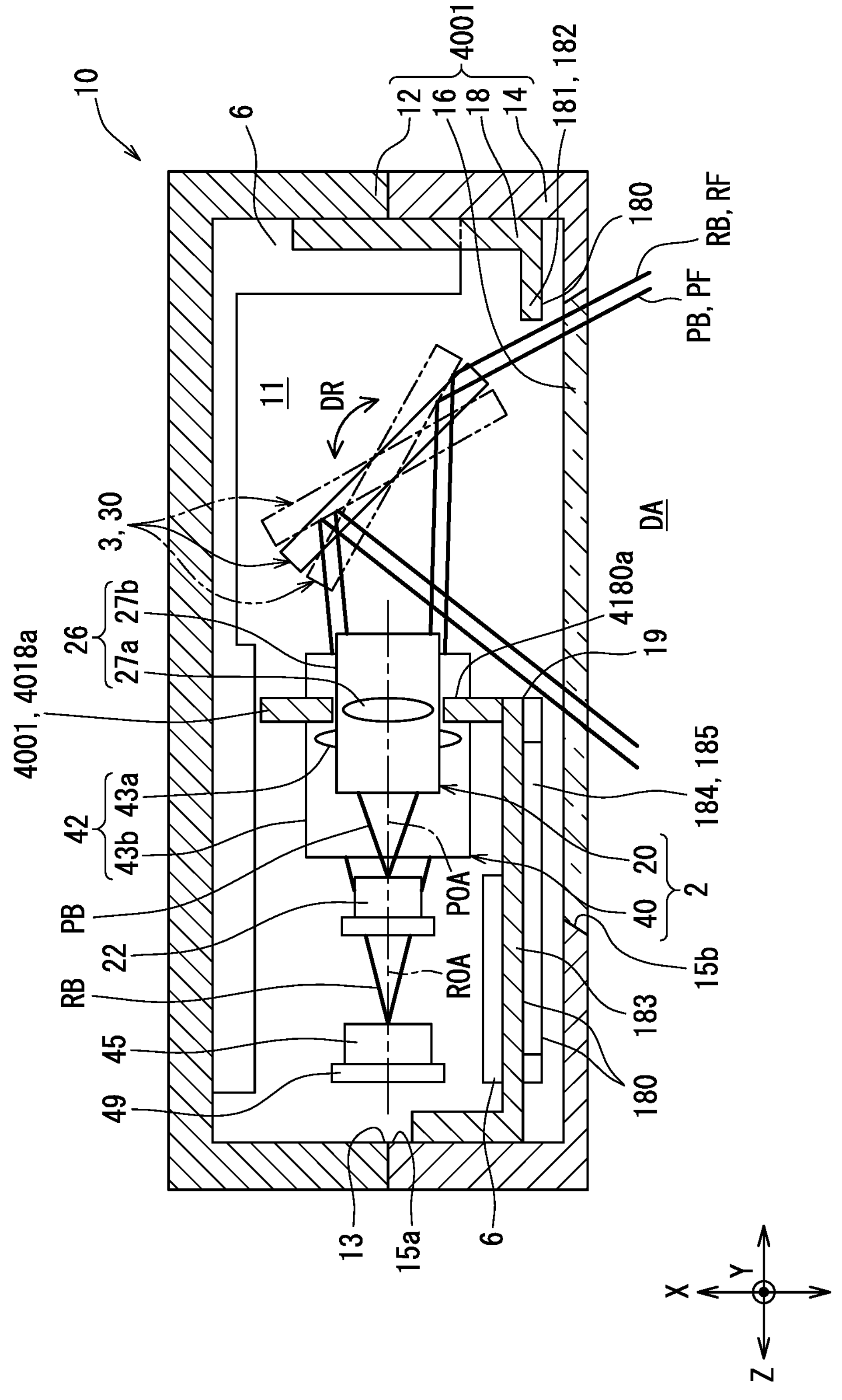
FIG. 22 is a schematic diagram of an optical sensing device according to a modified embodiment, corresponding to FIG. 6.
Figure 23:
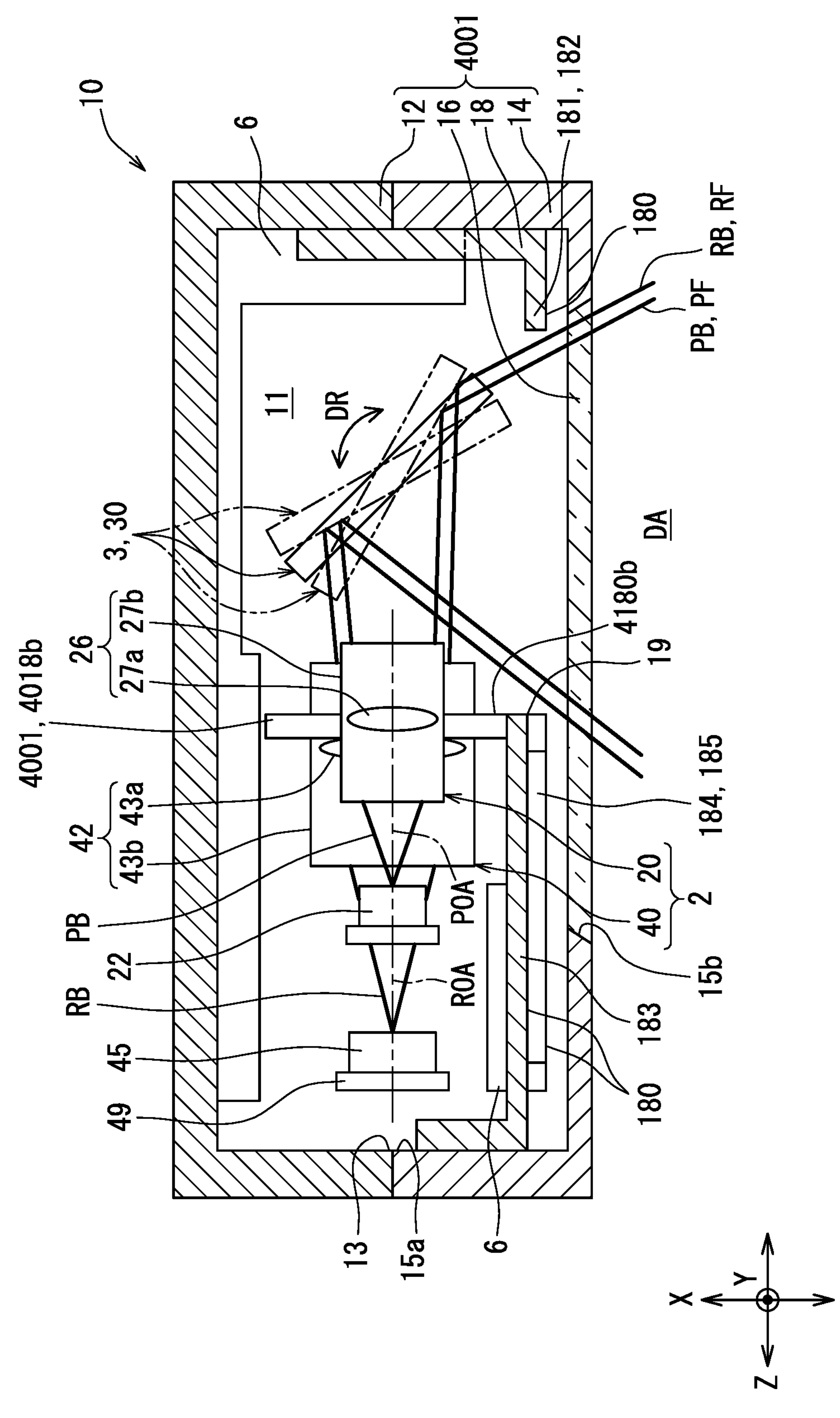
FIG. 23 is a schematic diagram of an optical sensing device according to a modified embodiment, corresponding to FIG. 6.

In a modification of the fourth embodiment, the scanning-side optical partition member 3018 may not be provided as shown in FIG. 21. In this case, the projecting-side optical partition member 4018*a* and the receiving-side optical partition member 4018*b*, both may be provided as shown in FIG. 21, or either one may be provided as shown in a modified example in FIGS. 22 and 23. In a modification of the fourth and fifth embodiments, only one of the projecting-side optical partition member 4018*a* and the receiving-side optical partition member 4018*b* may be provided.

Figure 24:
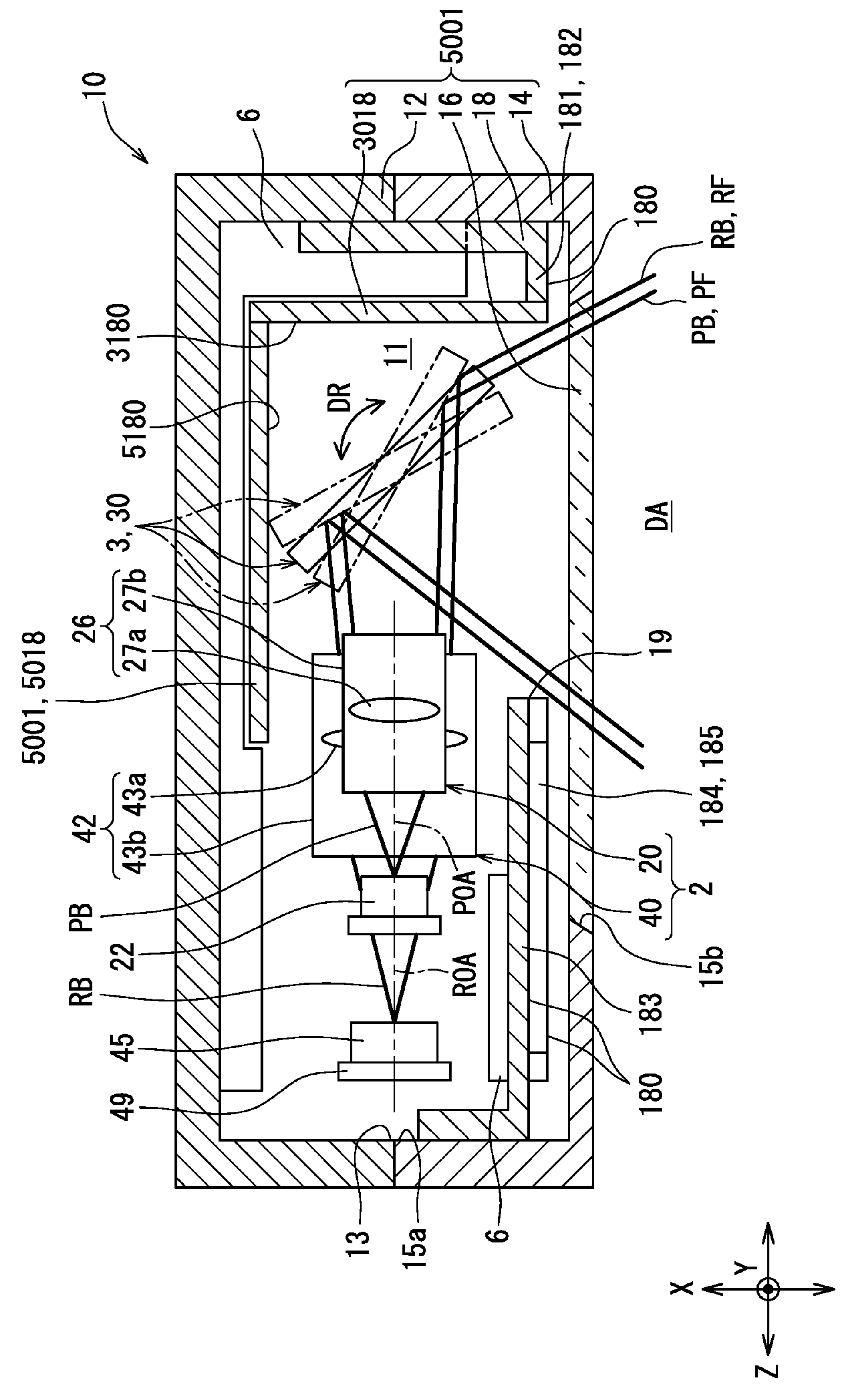
FIG. 24 is a schematic diagram of an optical sensing device according to a modified embodiment, corresponding to FIG. 6.
Figure 25:
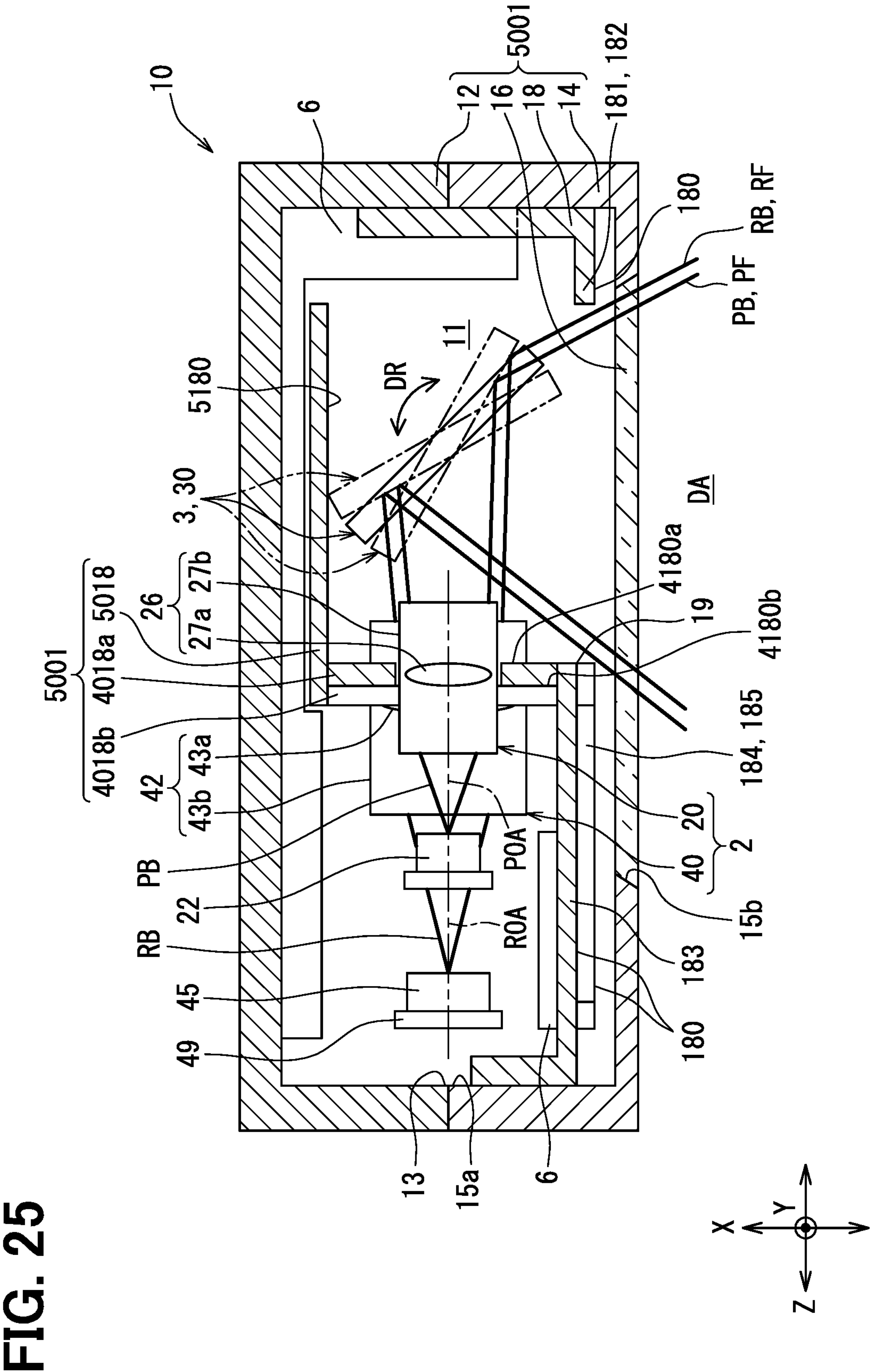
FIG. 25 is a schematic diagram of an optical sensing device according to a modified embodiment, corresponding to FIG. 6.

In a modification of the fifth embodiment, as shown in FIG. 24, the scanning-side optical partition member 5018 may be integrally formed or separately formed as an extension from the scanning-side optical partition member 3018 by not providing the projecting-side optical partition member 4018*a* and the receiving-side optical partition member 4018*b*. In a modification of the fifth embodiment, as shown in FIG. 25, the scanning-side optical partition member 5018 may be integrally formed or separately formed as an extension from the projecting-side optical partition member 4018*a* and the receiving-side optical partition member 4018*b* by not providing the scanning-side optical partition member 3018. In a further modification in which the scanning-side optical partition member 5018 is formed as the extension, only one of the projecting-side optical partition member 4018*a* and the receiving-side optical partition member 4018*b* may be provided.

What is claimed is:

1. An optical sensing device, which scans a projected beam toward an outside detection area and detects a reflected beam from the detection area with respect to the projected beam, the optical sensing device comprising:

an optical unit including a light projecting portion that projects the projected beam, and a light receiving portion that receives the reflected beam of which a footprint of an optical path overlaps with that of the projected beam; and an accommodation unit which forms an accommodation chamber accommodating the optical unit therein, wherein the accommodation unit includes:

an optical window portion which transmits the projected beam from the accommodation chamber to the detection area and transmits the reflected beam from the detection area to the accommodation chamber;

a holding portion which holds the optical window portion from a side of an outer periphery; and an optical partition member, in which a reflectance rate to the projected beam is lower than that of the holding portion on a side of the optical window portion and an absorptance rate to the projected beam is higher than that of the holding portion on a side of the optical window portion, is arranged to partition between the optical unit and the optical window portion, the light receiving portion includes a light-receiving lens system guiding the reflected beam which is formed with a large diameter protruding toward a side of the optical window portion more than a light-projecting lens system guiding the projected beam in the light projecting portion, the optical partition member includes a deflection structure which is deflected to a side of the optical window portion at a location next to the light-receiving lens system more than a location next to the light-projecting lens system, the optical partition member is arranged to surround footprints of the projected beam and the reflected beam from a side of an outer periphery and has a separation structure spaced apart from the optical window portion toward a side of the optical unit, and the deflection structure placed between the light receiving portion and the optical window portion is deflected toward a side of the optical window portion more than the separation structure placed between the light projecting portion and the optical window portion.

2. The optical sensing device according to claim 1, wherein the optical partition member comes into contact with at least one of an outer peripheral side edge portion of the optical window portion and an inner peripheral side edge portion of the holding portion.

3. The optical sensing device according to claim 1, further comprising:

a scanning unit which is accommodated in the accommodation chamber, scans the projected beam from the light projecting portion toward the detection area, and reflects the reflected beam from the detection area toward the light receiving portion.

4. The optical sensing device according to claim 3, wherein the scanning unit includes a mirror portion which is driven in a rotational manner, and wherein the optical window portion includes an inclined surface structure which is inclined with respect to a rotational axis direction of the mirror portion, on a side of the accommodation chamber.

5. The optical sensing device according to claim 4, wherein the optical partition member includes a parallel surface structure which is arranged in parallel along the inclined surface structure, on a side of the optical window portion.

6. The optical sensing device according to claim 3, wherein the accommodation unit includes a scanning side optical partition member which is arranged on at least one of a side of the scanning unit opposite to the optical unit and a side of the scanning unit opposite to the optical window portion and has a reflectance rate for the projected beam and the reflected beam lower than that of the holding portion on a side of the scanning unit and an absorptance rate to the projected beam and the reflected beam higher than that of the holding portion on a side of the scanning unit, in addition to the optical partition member as a window-side optical partition member.

7. The optical sensing device according to claim 3, wherein the accommodation unit includes a light-projecting side optical partition member which is arranged to surround the light projecting portion from a side of an outer periphery and has a reflectance rate for the projected beam and the reflected beam lower than that of the holding portion on a side of the scanning unit and an absorptance rate to the projected beam and the reflected beam higher than that of the holding portion on a side of the scanning unit, in addition to the optical partition member as a window-side optical partition member.

8. The optical sensing device according to claim 3, wherein the accommodation unit includes a light-receiving side optical partition member which is arranged to surround the light receiving portion from a side of an outer periphery and has a reflectance rate for the projected beam and the reflected beam lower than that of the holding portion on a side of the scanning unit and an absorptance rate to the projected beam and the reflected beam higher than that of the holding portion on a side of the scanning unit, in addition to the optical partition member as a window-side optical partition member.

9. The optical sensing device according to claim 1, wherein the accommodation unit includes a casing portion which defines the accommodation chamber by covering an opening with the optical window portion and the holding portion, and wherein the optical partition member is assembled and fixed to the casing portion from a side of the opening.

10. The optical sensing device according to claim 1, wherein the optical partition member is formed in a shape of a stepped plate frame to provide the separation structure and the deflection structure.

11. The optical sensing device according to claim 10, wherein the optical partition member has an outer peripheral side edge supported by the holding portion.

12. The optical sensing device according to claim 1, wherein the deflection structure is deflected in an arched shape.

13. An optical sensing device, which scans a projected beam toward an outside detection area and detects a reflected beam from the detection area with respect to the projected beam, the optical sensing device comprising:

an optical unit including a light projecting portion that projects the projected beam, and a light receiving portion that receives the reflected beam of which a footprint of an optical path overlaps with that of the projected beam; and an accommodation unit which forms an accommodation chamber accommodating the optical unit therein, wherein the accommodation unit includes:

an optical window portion which transmits the projected beam from the accommodation chamber to the detection area and transmits the reflected beam from the detection area to the accommodation chamber;

a holding portion which holds the optical window portion from a side of an outer periphery; and an optical partition member, in which a reflectance rate to the projected beam is lower than that of the holding portion on a side of the optical window portion and an absorptance rate to the projected beam is higher than that of the holding portion on a side of the optical window portion, is arranged to partition between the optical unit and the optical window portion, wherein the light receiving portion includes a light-receiving lens system guiding the reflected beam which is formed with a large diameter protruding toward a side of the optical window portion more than a light-projecting lens system guiding the projected beam in the light projecting portion, the optical partition member includes a deflection structure which is deflected to a side of the optical window portion at a location next to the light-receiving lens system more than a location next to the light-projecting lens system, the optical partition member is arranged to surround footprints of the projected beam and the reflected beam from a side of an outer periphery and has a separation structure spaced apart from the optical window portion toward a side of the optical unit, the deflection structure placed between the light receiving portion and the optical window portion is deflected toward a side of the optical window portion more than the separation structure placed between the light projecting portion and the optical window portion, the optical partition member is formed in a shape of a stepped plate frame to provide the separation structure and the deflection structure, the optical partition member has an outer peripheral side edge supported by the holding portion, the optical sensing device further comprises a scanning unit which is accommodated in the accommodation chamber, scans the projected beam from the light projecting portion toward the detection area, and reflects the reflected beam from the detection area toward the light receiving portion, and includes a mirror portion which is driven in a rotational manner, and the optical window portion includes an inclined surface structure which is inclined with respect to a rotational axis direction of the mirror portion, on a side of the accommodation chamber.

14. The optical sensing device according to claim 13, wherein the deflection structure is deflected in an arched shape.

* * * * *